(12) United States Patent
Yerramalli et al.

(10) Patent No.: US 11,723,064 B2
(45) Date of Patent: Aug. 8, 2023

(54) PACKET DUPLICATION FOR HIGH RELIABILITY COMMUNICATION

(71) Applicant: QUALCOMM Incorporated, San Diego, CA (US)

(72) Inventors: Srinivas Yerramalli, San Diego, CA (US); Xiaoxia Zhang, San Diego, CA (US); Seyed Ali Akbar Fakoorian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/685,567

(22) Filed: Mar. 3, 2022

(65) Prior Publication Data

US 2022/0191921 A1 Jun. 16, 2022

Related U.S. Application Data

(62) Division of application No. 16/662,822, filed on Oct. 24, 2019, now Pat. No. 11,297,644.

(Continued)

(51) Int. Cl.
*H04L 1/18* (2023.01)
*H04W 8/24* (2009.01)
(Continued)

(52) U.S. Cl.
CPC .......... *H04W 74/006* (2013.01); *H04L 1/189* (2013.01); *H04L 1/1816* (2013.01); *H04W 8/245* (2013.01);
(Continued)

(58) Field of Classification Search
CPC . H04L 1/08–1896; H04L 5/003–0098; H04W 8/22–245; H04W 72/005–14;
(Continued)

(56) References Cited

U.S. PATENT DOCUMENTS

2013/0039296 A1* 2/2013 Damnjanovic ... H04W 72/1289
2018/0255578 A1* 9/2018 Kim ................... H04W 72/1268
(Continued)

OTHER PUBLICATIONS

Huawei et al: "PBR Configuration for Duplication DRB", 3GPP Draft, 3GPP TSG-RAN2 Meeting #101, R2-1801939 PBR Configuration for Duplication DRB, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 16, 2018 (Feb. 16, 2018), XP051400064, pp. 1-3, Retrieved from the Internet: URL: http://www.3gpp.org/ftp/tsg%5Fran/WG2%5FRL2/TSGR2%5F101/Docs/ [retrieved on Feb. 16, 2018] p. 1.

(Continued)

*Primary Examiner* — Timothy J Weidner
(74) *Attorney, Agent, or Firm* — Holland & Hart LLP

(57) ABSTRACT

Methods, systems, and devices for wireless communication are described. Generally, the described techniques provide for increasing the chances that a high reliability packet scheduled to be transmitted in a shared radio frequency spectrum is received by a receiving device. In one example, a wireless device (e.g., a base station or a user equipment (UE)) may duplicate a packet at a packet data convergence protocol (PDCP) layer for transmission on multiple listen before talk (LBT) subchannels of a carrier to improve reliability. In another example, a wireless device may duplicate a packet at a physical (PHY) layer for transmission on multiple LBT subchannels of a carrier to improve reliability, or the wireless device may encode and map the packet to multiple LBT subchannels of a carrier for transmission on the multiple LBT subchannels to improve reliability.

29 Claims, 17 Drawing Sheets

Related U.S. Application Data

(60) Provisional application No. 62/753,046, filed on Oct. 30, 2018.

(51) Int. Cl.

| | | |
|---|---|---|
| *H04W 72/04* | (2023.01) | |
| *H04W 74/00* | (2009.01) | |
| *H04W 74/04* | (2009.01) | |
| *H04W 74/08* | (2009.01) | |
| *H04W 80/02* | (2009.01) | |
| *H04W 80/08* | (2009.01) | |
| *H04W 84/04* | (2009.01) | |
| *H04W 84/12* | (2009.01) | |
| *H04W 88/02* | (2009.01) | |
| *H04W 88/08* | (2009.01) | |
| *H04W 92/02* | (2009.01) | |
| *H04W 92/10* | (2009.01) | |
| *H04L 1/1867* | (2023.01) | |
| *H04L 1/1812* | (2023.01) | |
| *H04W 72/0453* | (2023.01) | |
| *H04W 72/23* | (2023.01) | |

(52) U.S. Cl.
CPC ....... *H04W 72/0453* (2013.01); *H04W 72/23* (2023.01); *H04W 74/04* (2013.01); *H04W 74/0808* (2013.01); *H04W 74/0866* (2013.01); *H04W 80/02* (2013.01); *H04W 80/08* (2013.01); *H04W 84/042* (2013.01); *H04W 84/12* (2013.01); *H04W 88/02* (2013.01); *H04W 88/08* (2013.01); *H04W 92/02* (2013.01); *H04W 92/10* (2013.01)

(58) Field of Classification Search
CPC ..... H04W 74/002–0891; H04W 80/02; H04W 80/08; H04W 84/02–16; H04W 88/02–10; H04W 92/02; H04W 92/04; H04W 92/10
See application file for complete search history.

(56) References Cited

U.S. PATENT DOCUMENTS

| | | | |
|---|---|---|---|
| 2018/0368132 A1* | 12/2018 | Babaei | H04W 72/048 |
| 2019/0222474 A1* | 7/2019 | Wittberg | H04W 72/0453 |
| 2020/0092746 A1 | 3/2020 | Baek et al. | |
| 2020/0136762 A1 | 4/2020 | Yerramalli et al. | |

OTHER PUBLICATIONS

International Preliminary Report on Patentability—PCT/US2019/058103, The International Bureau of WIPO—Geneva, Switzerland, dated May 14, 2021.
International Search Report and Written Opinion—PCT/US2019/058103—ISA/EPO—dated Mar. 25, 2020.
Partial International Search Report—PCT/US2019/058103—ISA/EPO—dated Jan. 24, 2020.

* cited by examiner

US 11,723,064 B2

PACKET DUPLICATION FOR HIGH RELIABILITY COMMUNICATION

CROSS REFERENCE

The present Application for Patent is a Divisional of U.S. patent application Ser. No. 16/662,822 by YERRAMALLI et al., entitled "PACKET DUPLICATION FOR HIGH RELIABILITY COMMUNICATION" filed Oct. 24, 2019, which claims the benefit of U.S. Provisional Patent Application No. 62/753,046 by YERRAMALLI et al., entitled "PACKET DUPLICATION FOR HIGH RELIABILITY COMMUNICATION," filed Oct. 30, 2018, assigned to the assignee hereof, which is hereby incorporated by reference in its entirety.

BACKGROUND

The following relates generally to wireless communications and more specifically to packet duplication for high reliability communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, wireless devices (e.g., UEs and base stations) may support high reliability communication (e.g., transmission and reception of high reliability packets). In some cases, it may be appropriate for a wireless device to transmit or receive a high reliability packet in a shared radio frequency spectrum. The shared radio frequency spectrum may be a spectrum that is unlicensed, licensed to multiple operators, or licensed to a single operator with opportunistic access by other devices. Conventional techniques for supporting high reliability communications in a shared radio frequency spectrum may be deficient.

SUMMARY

The described techniques relate to improved methods, systems, devices, and apparatuses that support high reliability communications in a shared radio frequency spectrum. Generally, the described techniques provide for increasing the chances that a high reliability packet scheduled to be transmitted in a shared radio frequency spectrum is received by a receiving device. In one example, a wireless device (e.g., a base station or a user equipment (UE)) may duplicate a packet at a packet data convergence protocol (PDCP) layer for transmission on multiple listen before talk (LBT) subchannels of a carrier to improve reliability. In another example, a wireless device may duplicate a packet at a physical (PHY) layer for transmission on multiple LBT subchannels of a carrier to improve reliability, or the wireless device may encode and map the packet to multiple LBT subchannels of a carrier for transmission on the multiple LBT subchannels to improve reliability.

A method for wireless communication by a user equipment is described. The method may include receiving configuration signaling indicating a mapping of a first logical channel to a first subchannel of a carrier and a second logical channel to a second subchannel of the carrier and transmitting or receiving a transmission of a first data packet via the first subchannel of the carrier and a duplicate of the transmission associated with the second logical channel via the second subchannel of the carrier based on the mapping.

An apparatus for wireless communication by a user equipment is described. The apparatus may include a processor, memory in electronic communication with the processor, and instructions stored in the memory. The instructions may be executable by the processor to cause the apparatus to receive configuration signaling indicating a mapping of a first logical channel to a first subchannel of a carrier and a second logical channel to a second subchannel of the carrier and transmit or receiving a transmission of a first data packet via the first subchannel of the carrier and a duplicate of the transmission associated with the second logical channel via the second subchannel of the carrier based on the mapping.

Another apparatus for wireless communication by a user equipment is described. The apparatus may include means for receiving configuration signaling indicating a mapping of a first logical channel to a first subchannel of a carrier and a second logical channel to a second subchannel of the carrier and transmitting or receiving a transmission of a first data packet via the first subchannel of the carrier and a duplicate of the transmission associated with the second logical channel via the second subchannel of the carrier based on the mapping.

A non-transitory computer-readable medium storing code for wireless communication by a user equipment is described. The code may include instructions executable by a processor to receive configuration signaling indicating a mapping of a first logical channel to a first subchannel of a carrier and a second logical channel to a second subchannel of the carrier and transmit or receiving a transmission of a first data packet via the first subchannel of the carrier and a duplicate of the transmission associated with the second logical channel via the second subchannel of the carrier based on the mapping.

Some examples of the method, apparatuses, and non-transitory computer-readable medium described herein may further include operations, features, means, or instructions for generating a first data packet for the first logical channel and a duplicate first data packet for the second logical channel. In some examples of the method, apparatuses, and non-transitory computer-readable medium described herein the transmitting or receiving further may include transmitting the transmission comprising the first data packet via the first subchannel of the carrier and the duplicate of the transmission comprising the duplicate first data packet via the second subchannel of the carrier.

In some examples of the method, apparatuses, and non-transitory computer-readable medium described herein, the mapping indicates a second mapping of a third logical channel to a third subchannel of the carrier, and where the method further may include operations, features, means, or instructions for transmitting or receiving a second duplicate of the transmission via the third subchannel of the carrier based on the second mapping. In some examples of the method, apparatuses, and non-transitory computer-readable medium described herein, receiving the configuration signaling further may include operations, features, means, or instructions for receiving the configuration signaling indicating a prohibited subchannel of the carrier.

In some examples of the method, apparatuses, and non-transitory computer-readable medium described herein, the transmitting or receiving further may include operations, features, means, or instructions for performing a first listen before talk procedure on the first subchannel prior to transmitting the transmission, and performing a second listen before talk procedure on the second subchannel prior to transmitting the duplicate of the transmission. In some examples of the method, apparatuses, and non-transitory computer-readable medium described herein, each of the first subchannel and the second subchannel may be a different listen before talk subchannel of the carrier.

In some examples of the method, apparatuses, and non-transitory computer-readable medium described herein, each of the first subchannel and the second subchannel may be a different bandwidth part of the carrier. In some examples of the method, apparatuses, and non-transitory computer-readable medium described herein, the first logical channel may be associated with a first channel identifier that differs from a second channel identifier of the second logical channel. In some examples of the method, apparatuses, and non-transitory computer-readable medium described herein, the first data packet may be a PDCP packet.

A method for wireless communication by a user equipment is described. The method may include receiving one or more grants scheduling transmission of a first data packet in a first subchannel and a second subchannel of a carrier and transmitting or receiving the transmission via the first subchannel and the second subchannel of the carrier based on the one or more grants.

An apparatus for wireless communication by a user equipment is described. The apparatus may include a processor, memory in electronic communication with the processor, and instructions stored in the memory. The instructions may be executable by the processor to cause the apparatus to receive one or more grants scheduling transmission of a first data packet in a first subchannel and a second subchannel of a carrier and transmit or receiving the transmission via the first subchannel and the second subchannel of the carrier based on the one or more grants.

Another apparatus for wireless communication by a user equipment is described. The apparatus may include means for receiving one or more grants scheduling transmission of a first data packet in a first subchannel and a second subchannel of a carrier and transmitting or receiving the transmission via the first subchannel and the second subchannel of the carrier based on the one or more grants.

A non-transitory computer-readable medium storing code for wireless communication by a user equipment is described. The code may include instructions executable by a processor to receive one or more grants scheduling transmission of a first data packet in a first subchannel and a second subchannel of a carrier and transmit or receiving the transmission via the first subchannel and the second subchannel of the carrier based on the one or more grants.

Some examples of the method, apparatuses, and non-transitory computer-readable medium described herein may further include operations, features, means, or instructions for receiving configuration signaling indicating a rate matching scheme. In some examples of the method, apparatuses, and non-transitory computer-readable medium described herein, the transmitting or receiving further may include operations, features, means, or instructions for receiving a first transmission of the first data packet via the first subchannel of the carrier and a second transmission of the first data packet via the second subchannel of the carrier, de-rate matching the first transmission to generate a de-rate matched first transmission based on the rate matching scheme, de-rate matching the second transmission to generate a de-rate matched second transmission based on the rate matching scheme, and applying a decoding algorithm to the de-rate matched first transmission, the de-rate matched second transmission, or both.

In some examples of the method, apparatuses, and non-transitory computer-readable medium described herein, the rate matching scheme indicates that the de-rate matched first transmission includes a first redundancy version generated from the first data packet and at least a portion of a second redundancy version generated from the first data packet. In some examples of the method, apparatuses, and non-transitory computer-readable medium described herein, the rate matching scheme indicates that the de-rate matched second transmission includes the first redundancy version of the first data packet and at least a portion of a third redundancy version of the first data packet, the second redundancy version differing from the third redundancy version.

In some examples of the method, apparatuses, and non-transitory computer-readable medium described herein, the transmitting or receiving further may include operations, features, means, or instructions for rate matching a first transmission of the first data packet to generate a rate matched first transmission based on the rate matching scheme, rate matching a second transmission of the first data packet to generate a rate matched second transmission based on the rate matching scheme, and transmitting the rate matched first transmission via the first subchannel of the carrier and the rate matched second transmission via the second subchannel of the carrier.

In some examples of the method, apparatuses, and non-transitory computer-readable medium described herein, the rate matching scheme indicates that the rate matched first transmission includes a first redundancy version generated from the first data packet and at least a portion of a second redundancy version generated from the first data packet. In some examples of the method, apparatuses, and non-transitory computer-readable medium described herein, the rate matching scheme indicates that the rate matched second transmission includes the first redundancy version generated from the first data packet and at least a portion of a third redundancy version generated from the first data packet, the second redundancy version differing from the third redundancy version.

Some examples of the method, apparatuses, and non-transitory computer-readable medium described herein may further include operations, features, means, or instructions for receiving configuration signaling indicating a code rate, and decoding the transmission based on the code rate. In some examples of the method, apparatuses, and non-transitory computer-readable medium described herein, the code rate may be smaller than $1/3$ of a number of subchannels to which transmissions of the data packet may be mapped.

In some examples of the method, apparatuses, and non-transitory computer-readable medium described herein, receiving the one or more grants further may include operations, features, means, or instructions for receiving a first grant scheduling a first transmission of the first data packet via the first subchannel of the carrier and a second grant scheduling a second transmission of the first data packet via the second subchannel of the carrier. Some examples of the method, apparatuses, and non-transitory computer-readable medium described herein may further include operations, features, means, or instructions for determining an association between the first transmission and the second transmission based on the first grant and the second grant, and soft combining the first transmission and the second transmission to decode the first data packet based on the association.

In some examples of the method, apparatuses, and non-transitory computer-readable medium described herein, determining the association further may include operations, features, means, or instructions for identifying a common feedback identifier for the first subchannel of the carrier and the second subchannel of the carrier within a same transmission time interval, where the first transmission and the second transmission each correspond to the common feedback identifier. Some examples of the method, apparatuses, and non-transitory computer-readable medium described herein may further include operations, features, means, or instructions for transmitting a joint feedback message via the first subchannel, the second subchannel, or both, to provide joint feedback on the first transmission and the second transmission.

Some examples of the method, apparatuses, and non-transitory computer-readable medium described herein may further include operations, features, means, or instructions for transmitting a first feedback message via the first subchannel of the carrier to provide feedback on the first transmission and a second feedback message via the second subchannel of the carrier to provide feedback on the second transmission. Some examples of the method, apparatuses, and non-transitory computer-readable medium described herein may further include operations, features, means, or instructions for generating the first data packet to include a duplication tag, and generating a first transmission including the first packet and a second transmission including the first data packet based on the duplication tag, where the transmitting or receiving further includes. In some examples of the method, apparatuses, and non-transitory computer-readable medium described herein, the first data packet may be a medium access control service data unit (MAC-SDU).

Some examples of the method, apparatuses, and non-transitory computer-readable medium described herein may further include operations, features, means, or instructions for receiving configuration signaling indicating at least one feedback resource for the first subchannel, the second subchannel, or both, and transmitting, via the at least one feedback resource, a feedback message. In some examples of the method, apparatuses, and non-transitory computer-readable medium described herein, the transmitting or receiving further may include operations, features, means, or instructions for receiving a first transmission of the first data packet via the first subchannel of the carrier and a second transmission of the first data packet via the second subchannel of the carrier, where the feedback message may be a joint feedback message that provides feedback for the first transmission and the second transmission.

In some examples of the method, apparatuses, and non-transitory computer-readable medium described herein, each of the first subchannel and the second subchannel may be a different listen before talk subchannel of the carrier. In some examples of the method, apparatuses, and non-transitory computer-readable medium described herein, each of the first subchannel and the second subchannel may be a different bandwidth part of the carrier. In some examples of the method, apparatuses, and non-transitory computer-readable medium described herein, the transmitting or receiving further may include operations, features, means, or instructions for receiving a first transmission of the first data packet via the first subchannel of the carrier and a second transmission of the first data packet via the second subchannel of the carrier, where each of the first transmission and the second transmission may be self-decodable. In some examples of the method, apparatuses, and non-transitory computer-readable medium described herein, the first data packet may be a PDCP packet.

A method for wireless communication by a base station is described. The method may include transmitting configuration signaling indicating a mapping of a first logical channel to a first subchannel of a carrier and a second logical channel to a second subchannel of the carrier and transmitting or receiving a transmission of a first data packet via the first subchannel of the carrier and a duplicate of the transmission associated with the second logical channel via the second subchannel of the carrier based on the mapping.

An apparatus for wireless communication by a base station is described. The apparatus may include a processor, memory in electronic communication with the processor, and instructions stored in the memory. The instructions may be executable by the processor to cause the apparatus to transmit configuration signaling indicating a mapping of a first logical channel to a first subchannel of a carrier and a second logical channel to a second subchannel of the carrier and transmit or receiving a transmission of a first data packet via the first subchannel of the carrier and a duplicate of the transmission associated with the second logical channel via the second subchannel of the carrier based on the mapping.

Another apparatus for wireless communication by a base station is described. The apparatus may include means for transmitting configuration signaling indicating a mapping of a first logical channel to a first subchannel of a carrier and a second logical channel to a second subchannel of the carrier and transmitting or receiving a transmission of a first data packet via the first subchannel of the carrier and a duplicate of the transmission associated with the second logical channel via the second subchannel of the carrier based on the mapping.

A non-transitory computer-readable medium storing code for wireless communication by a base station is described. The code may include instructions executable by a processor to transmit configuration signaling indicating a mapping of a first logical channel to a first subchannel of a carrier and a second logical channel to a second subchannel of the carrier and transmit or receiving a transmission of a first data packet via the first subchannel of the carrier and a duplicate of the transmission associated with the second logical channel via the second subchannel of the carrier based on the mapping.

Some examples of the method, apparatuses, and non-transitory computer-readable medium described herein may further include operations, features, means, or instructions for generating a first data packet for the first logical channel and a duplicate first data packet for the second logical channel. In some examples of the method, apparatuses, and non-transitory computer-readable medium described herein the transmitting or receiving further may include transmitting the transmission comprising the first data packet via the first subchannel of the carrier and the duplicate of the transmission comprising the duplicate first data packet via the second subchannel of the carrier.

In some examples of the method, apparatuses, and non-transitory computer-readable medium described herein, the mapping indicates a second mapping of a third logical channel to a third subchannel of the carrier, and where the method further may include operations, features, means, or instructions for transmitting or receiving a second duplicate of the transmission via the third subchannel of the carrier based on the second mapping. In some examples of the method, apparatuses, and non-transitory computer-readable medium described herein, transmitting the configuration signaling further may include operations, features, means, or instructions for transmitting the configuration signaling indicating a prohibited subchannel of the carrier.

In some examples of the method, apparatuses, and non-transitory computer-readable medium described herein, the transmitting or receiving further may include operations, features, means, or instructions for performing a listen before talk procedure on each of the each of the first subchannel and the second subchannel prior to transmitting the transmission and the duplicate of the transmission. In some examples of the method, apparatuses, and non-transitory computer-readable medium described herein, each of the first subchannel and the second subchannel may be a different listen before talk subchannel of the carrier.

In some examples of the method, apparatuses, and non-transitory computer-readable medium described herein, each of the first subchannel and the second subchannel may be a different bandwidth part of the carrier. In some examples of the method, apparatuses, and non-transitory computer-readable medium described herein, the first logical channel may be associated with a first channel identifier that differs from a second channel identifier of the second logical channel. In some examples of the method, apparatuses, and non-transitory computer-readable medium described herein, the first data packet may be a PDCP packet.

A method for wireless communication by a base station is described. The method may include transmitting one or more grants scheduling transmission of a first data packet in a first subchannel and a second subchannel of a carrier and transmitting or receiving the transmission via the first subchannel and the second subchannel of the carrier based on the one or more grants.

An apparatus for wireless communication by a base station is described. The apparatus may include a processor, memory in electronic communication with the processor, and instructions stored in the memory. The instructions may be executable by the processor to cause the apparatus to transmit one or more grants scheduling transmission of a first data packet in a first subchannel and a second subchannel of a carrier and transmit or receiving the transmission via the first subchannel and the second subchannel of the carrier based on the one or more grants.

Another apparatus for wireless communication by a base station is described. The apparatus may include means for transmitting one or more grants scheduling transmission of a first data packet in a first subchannel and a second subchannel of a carrier and transmitting or receiving the transmission via the first subchannel and the second subchannel of the carrier based on the one or more grants.

A non-transitory computer-readable medium storing code for wireless communication by a base station is described. The code may include instructions executable by a processor to transmit one or more grants scheduling transmission of a first data packet in a first subchannel and a second subchannel of a carrier and transmit or receiving the transmission via the first subchannel and the second subchannel of the carrier based on the one or more grants.

Some examples of the method, apparatuses, and non-transitory computer-readable medium described herein may further include operations, features, means, or instructions for transmitting configuration signaling indicating a rate matching scheme. In some examples of the method, apparatuses, and non-transitory computer-readable medium described herein, the transmitting or receiving further may include operations, features, means, or instructions for receiving a first transmission of the first data packet via the first subchannel of the carrier and a second transmission of the first data packet via the second subchannel of the carrier, de-rate matching the first transmission to generate a de-rate matched first transmission based on the rate matching scheme, de-rate matching the second transmission to generate a de-rate matched second transmission based on the rate matching scheme, and applying a decoding algorithm to the de-rate matched first transmission, the de-rate matched second transmission, or both.

In some examples of the method, apparatuses, and non-transitory computer-readable medium described herein, the rate matching scheme indicates that the de-rate matched first transmission includes a first redundancy version generated from the first data packet and at least a portion of a second redundancy version generated from the first data packet. In some examples of the method, apparatuses, and non-transitory computer-readable medium described herein, the rate matching scheme indicates that the de-rate matched second transmission includes the first redundancy version of the first data packet and at least a portion of a third redundancy version of the first data packet, the second redundancy version differing from the third redundancy version.

In some examples of the method, apparatuses, and non-transitory computer-readable medium described herein, the transmitting or receiving further may include operations, features, means, or instructions for rate matching a first transmission of the first data packet to generate a rate matched first transmission based on the rate matching scheme, rate matching a second transmission of the first data packet to generate a rate matched second transmission based on the rate matching scheme, and transmitting the rate matched first transmission via the first subchannel of the carrier and the rate matched second transmission via the second subchannel of the carrier.

In some examples of the method, apparatuses, and non-transitory computer-readable medium described herein, the rate matching scheme indicates that the rate matched first transmission includes a first redundancy version generated from the first data packet and at least a portion of a second redundancy version generated from the first data packet. In some examples of the method, apparatuses, and non-transitory computer-readable medium described herein, the rate matching scheme indicates that the rate matched second transmission includes the first redundancy version generated from the first data packet and at least a portion of a third redundancy version generated from the first data packet, the second redundancy version differing from the third redundancy version.

Some examples of the method, apparatuses, and non-transitory computer-readable medium described herein may further include operations, features, means, or instructions for transmitting configuration signaling indicating a code rate, and decoding the transmission based on the code rate. In some examples of the method, apparatuses, and non-transitory computer-readable medium described herein, the code rate may be smaller than $1/3$ of a number of subchannels to which transmissions of the data packet may be mapped.

In some examples of the method, apparatuses, and non-transitory computer-readable medium described herein, transmitting the one or more grants further may include operations, features, means, or instructions for transmitting a first grant scheduling a first transmission of the first data packet via the first subchannel of the carrier and a second grant scheduling a second transmission of the first data packet via the second subchannel of the carrier. Some examples of the method, apparatuses, and non-transitory computer-readable medium described herein may further include operations, features, means, or instructions for determining an association between the first transmission and the second transmission based on the first grant and the second grant, and soft combining the first transmission and the second transmission to decode the first data packet based on the association.

In some examples of the method, apparatuses, and non-transitory computer-readable medium described herein, determining the association further may include operations, features, means, or instructions for identifying a common feedback identifier for the first subchannel of the carrier and the second subchannel of the carrier within a same transmission time interval, where the first transmission and the second transmission each correspond to the common feedback identifier. Some examples of the method, apparatuses, and non-transitory computer-readable medium described herein may further include operations, features, means, or instructions for receiving a joint feedback message via the first subchannel, the second subchannel, or both, that provides joint feedback on the first transmission and the second transmission.

Some examples of the method, apparatuses, and non-transitory computer-readable medium described herein may further include operations, features, means, or instructions for receiving a first feedback message via the first subchannel of the carrier that provides feedback on the first transmission and a second feedback message via the second subchannel of the carrier that provides feedback on the second transmission. Some examples of the method, apparatuses, and non-transitory computer-readable medium described herein may further include operations, features, means, or instructions for generating the first data packet to include a duplication tag, and generating a first transmission including the first packet and a second transmission including the first data packet based on the duplication tag, where the transmitting or receiving further includes. In some examples of the method, apparatuses, and non-transitory computer-readable medium described herein, the first data packet may be a MAC-SDU.

Some examples of the method, apparatuses, and non-transitory computer-readable medium described herein may further include operations, features, means, or instructions for transmitting configuration signaling indicating at least one feedback resource for the first subchannel, the second subchannel, or both, and receiving, via the at least one feedback resource, a feedback message. In some examples of the method, apparatuses, and non-transitory computer-readable medium described herein, the transmitting or receiving further may include operations, features, means, or instructions for transmitting a first transmission of the first data packet via the first subchannel of the carrier and a second transmission of the first data packet via the second subchannel of the carrier, where the feedback message may be a joint feedback message that provides feedback for the first transmission and the second transmission.

In some examples of the method, apparatuses, and non-transitory computer-readable medium described herein, each of the first subchannel and the second subchannel may be a different listen before talk subchannel of the carrier. In some examples of the method, apparatuses, and non-transitory computer-readable medium described herein, each of the first subchannel and the second subchannel may be a different bandwidth part of the carrier. In some examples of the method, apparatuses, and non-transitory computer-readable medium described herein, the transmitting or receiving further may include operations, features, means, or instructions for transmitting a first transmission of the first data packet via the first subchannel of the carrier and a second transmission of the first data packet via the second subchannel of the carrier, where each of the first transmission and the second transmission may be self-decodable. In some examples of the method, apparatuses, and non-transitory computer-readable medium described herein, the first data packet may be a PDCP packet.

DETAILED DESCRIPTION

Some wireless communications systems may support high reliability communications in a shared radio frequency spectrum band (e.g., ultra-reliable low latency communications (URLLC) in an unlicensed spectrum (URLLC-U)). In some cases, a wireless device (e.g., base station or user equipment (UE)) may not be able to gain access to a listen-before-talk (LBT) subchannel for a transmission of a high reliability packet (e.g., a packet associated with high reliability requirements) in a shared radio frequency band (e.g., when the LBT subchannel is being used by another wireless device). In such cases, the wireless device may not be able to transmit the high reliability packet on the LBT subchannel. Further, even if the wireless device is able to gain access to an LBT subchannel to transmit a high reliability packet, the transmission of the high reliability packet on the single LBT subchannel may not be reliable (e.g., when channel conditions are poor).

As described herein, a wireless communications system may support efficient techniques for increasing the chances that a high reliability packet scheduled to be transmitted in a shared radio frequency spectrum is received by a receiving device. In particular, wireless devices may support techniques for transmitting or receiving a high reliability packet on multiple LBT subchannels of a carrier in the shared radio frequency spectrum. In one example, a wireless device (e.g., a base station or a user equipment (UE)) may duplicate a packet at a packet data convergence protocol (PDCP) layer for transmission on multiple LBT subchannels of a carrier to improve reliability. In another example, a wireless device may duplicate a packet at a physical (PHY) layer for transmission on multiple LBT subchannels of a carrier to improve reliability, or the wireless device may encode and map the packet to multiple LBT subchannels of a carrier for transmission on the multiple LBT subchannels to improve reliability.

Aspects of the disclosure introduced above are described herein in the context of a wireless communications system. Examples of processes and signaling exchanges that support packet duplication for high reliability communication are then described. Aspects of the disclosure are further illustrated by and described with reference to apparatus diagrams, system diagrams, and flowcharts that relate to packet duplication for high reliability communication.

Figure 1:
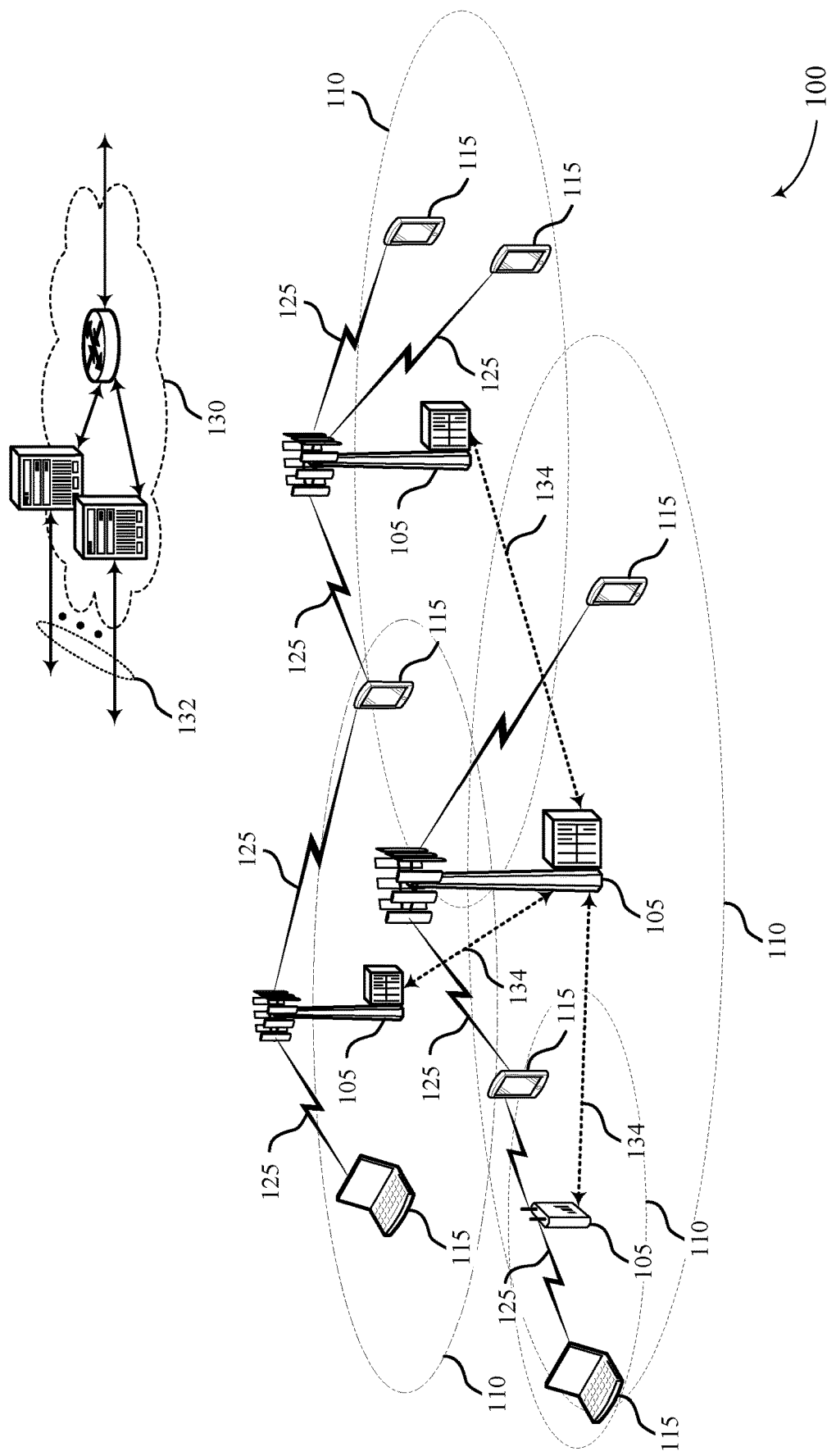
FIGS. 1 and 2 illustrate examples of wireless communications systems in accordance with aspects of the present disclosure.

FIG. 1 illustrates an example of a wireless communications system 100 in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, ultra-reliable low latency communications (URLLC), or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink shared channel (PUSCH) or a physical uplink control channel (PUCCH)) or downlink transmissions from a base station 105 to a UE 115 (e.g., in a physical downlink shared channel (PDSCH) or a physical downlink control channel (PDCCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in a frequency division duplexing (FDD) mode) or may be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In some cases, wireless communications system 100 may utilize both unshared (e.g., licensed) and shared (e.g., unlicensed) radio frequency spectrum bands. For example, wireless communications system 100 may employ License Assisted Access (LAA), LTE-Unlicensed (LTE-U) radio access technology, or NR technology in an unlicensed band such as the 5 GHz industrial, scientific and medical (ISM) band. When operating in unlicensed radio frequency spectrum bands, wireless devices such as base stations 105 and UEs 115 may employ listen-before-talk (LBT) procedures to ensure a frequency channel (e.g., an LBT subchannel or a frequency band that is accessible via a LBT procedure) is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on FDD, TDD, or a combination of both.

Wireless communications system 100 may support high reliability communications in a shared radio frequency spectrum band (e.g., URLLC-U). In some cases, however, a wireless device (e.g., UE 115 or base station 105) may not be able to gain access to an LBT subchannel for a transmission of a high reliability packet (e.g., a packet associated with high reliability requirements) in a shared radio frequency band (e.g., when the LBT subchannel is being used by another wireless device). In such cases, the wireless device may not be able to transmit the high reliability packet on the LBT subchannel. Further, even if the wireless device is able to gain access to an LBT subchannel to transmit a high reliability packet, the transmission of the high reliability packet on the single LBT subchannel may not be reliable (e.g., when channel conditions are poor). Wireless communications system 100 may support efficient techniques for increasing the chances that a high reliability packet to be transmitted in a shared radio frequency spectrum is received by a receiving device.

Figure 2:
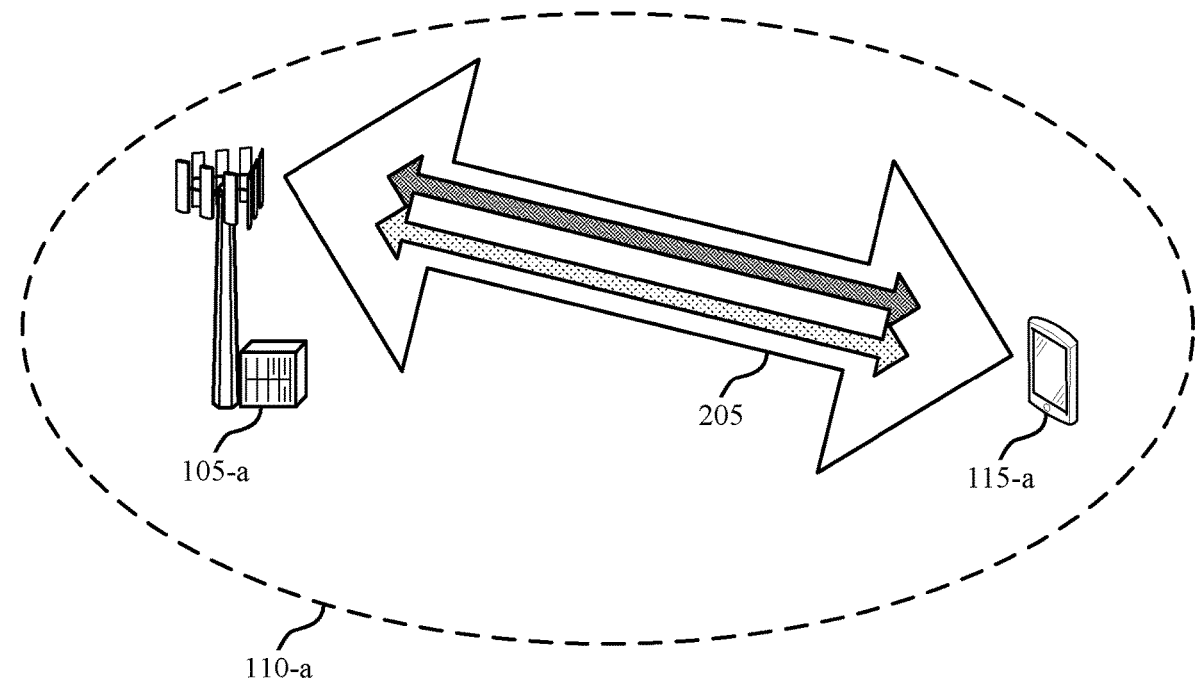

FIG. 2 illustrates an example of a wireless communications system 200 in accordance with aspects of the present disclosure. Wireless communications system 200 includes base station 105-a, which may be an example of a base station 105 described with reference to FIG. 1. Wireless communications system 200 also includes UE 115-a, which may be an example of a UE 115 described with reference to FIG. 1. Base station 105-a may provide communication coverage for a respective coverage area 110-a. Base station 105-a may communicate with UE 115-a on resources of a carrier 205 in a shared radio frequency spectrum. Wireless communications system 200 may implement aspects of wireless communications system 100. For example, wireless communications system 200 may support efficient techniques for increasing the chances that a high reliability packet to be transmitted in a shared radio frequency spectrum is received by a receiving device.

In the example of FIG. 2, base station 105-a may be scheduled for a data transmission to UE 115-a. Using the techniques described herein, the base station 105-a may transmit the data to the UE on the first LBT subchannel 210-a and the second LBT subchannel 210-b within a same carrier 205. In one aspect, the base station 105-a may generate a data packet at a PDCP layer, and the base station 105-a may duplicate the data packet at the PDCP layer for transmission to UE 115-a on the first LBT subchannel 210-a and the second LBT subchannel 210-b. In another aspect, the base station 105-a may generate a data packet, and the base station 105-a may duplicate the data packet at a PHY layer for transmission to UE 115-a on the first LBT subchannel 210-a and the second LBT subchannel 210-b, or the base station 105-a may map the data packet to the first LBT subchannel 210-a and the second subchannel 210-b. Although these aspects are described independently, it is to be understood that the techniques may be combined for transmission of data across multiple LBT subchannels 210 in a shared radio frequency spectrum (e.g., unlicensed radio frequency spectrum). Further, although the examples described relate to a downlink transmission from a base station 105-a to a UE 115-a, it is to be understood that the same or similar techniques may be applied for an uplink transmission from a UE 115-a to a base station 105-a.

Figure 3:
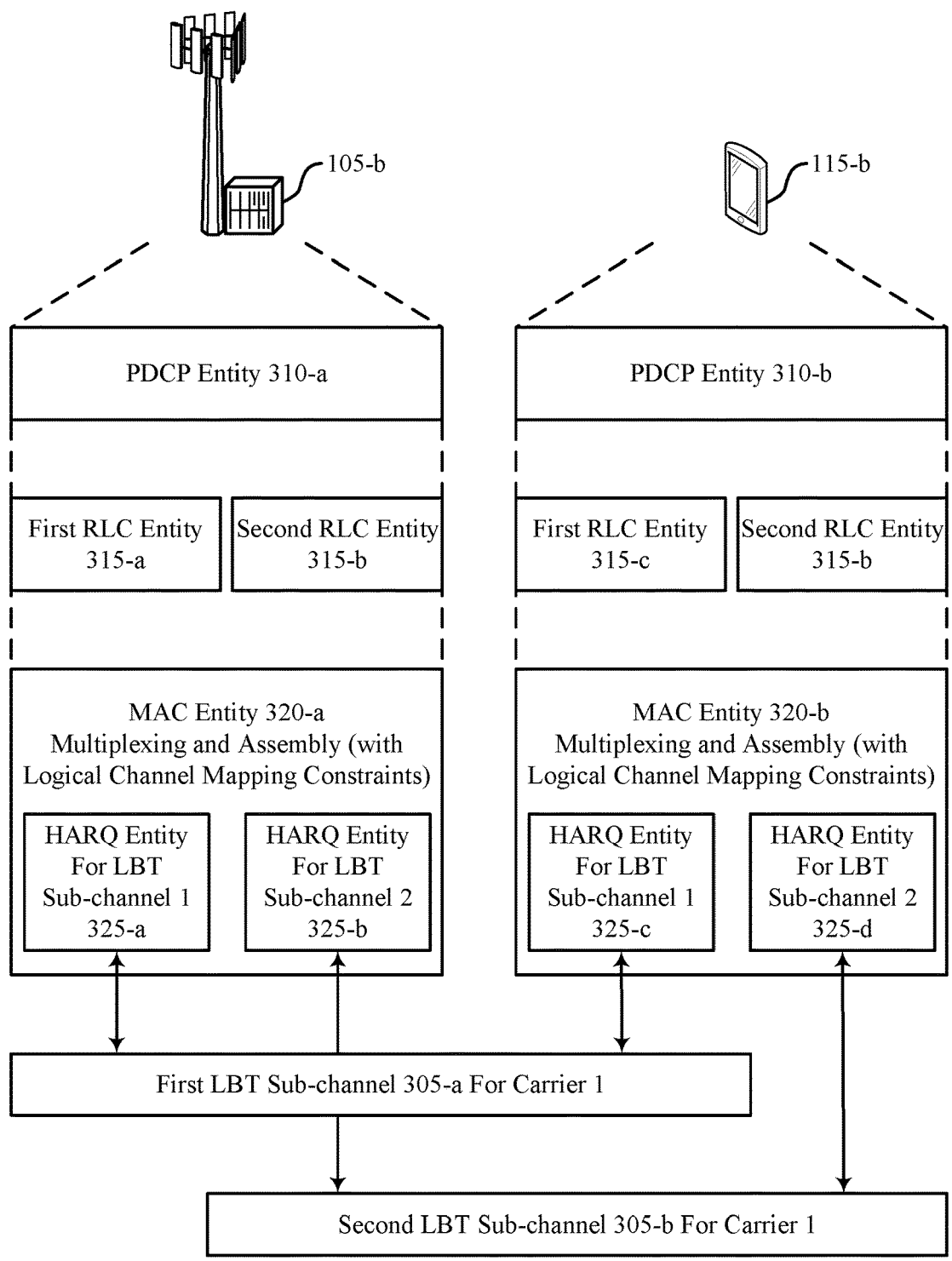
FIG. 3 illustrates an example of data packet duplication at a packet data convergence protocol (PDCP) in accordance with aspects of the present disclosure.

FIG. 3 illustrates an example of data packet duplication 300 at a PDCP layer in accordance with aspects of the present disclosure. In one example of FIG. 3, base station 105-b may be scheduled for a data transmission to UE 115-b. Accordingly, using the techniques described herein, base station 105-b may generate a data packet and duplicate the data packet at a PDCP entity 310-a for transmission on first and second LBT subchannels 305 on a carrier. Specifically, the PDCP entity 310-a at the base station 105-b may receive a PDCP service data unit (SDU) in the form of an IP packet, and the PDCP entity 310-a may identify that the IP packet is to be duplicated for transmission to improve reliability (e.g., based on a flow associated with the IP packet having a high reliability requirement). Thus, a duplication function at the PDCP entity 310-a may duplicate the PDCP SDU.

The PDCP entity 310-a may then pass the original data packet as a first PDCP protocol data unit (PDU) to a first RLC entity 315-a and pass the duplicated data packet as a second PDCP PDU to a second RLC entity 315-a. The first RLC entity 315-a may receive the original data packet as a first RLC SDU and may map the original data packet to a first logical channel, and the second RLC entity 315-b may receive the duplicated data packet as a second RLC SDU and may map the duplicated data packet to a second logical channel (e.g., where the first and second logical channels have different IDs but are of the same type). The first RLC entity 315-a may then pass the original data packet mapped to the first logical channel as an RLC PDU to MAC entity 320-a, and the second RLC entity 315-b may pass the duplicated data packet mapped to the second logical channel as another RLC PDU to MAC entity 320-a.

The MAC entity 320-a may receive the original data packet mapped to the first logical channel and the duplicated data packet mapped to the second logical channel, and the MAC entity 320-a may map the first logical channel including the original data packet to the first LBT subchannel 305-a and the second logical channel including the duplicated data packet to the second LBT subchannel 305-b. In some cases, a first HARQ entity 325-a associated with transmissions on the first LBT subchannel 305-a on a carrier may map the first logical channel to the first LBT subchannel 305-a, and a second HARQ entity 325-b associated with transmissions on the second LBT subchannel 305-b on a carrier may map the second logical channel to the second LBT subchannel 305-b. In other cases, however, a same HARQ entity associated with transmissions on the carrier may map the first logical channel to the first LBT subchannel 305-a and map the second logical channel to the second LBT subchannel 305-b.

Once the logical channels including the original and duplicated data packets are mapped to corresponding subchannels 305, the MAC entity 320-a may pass the original data packet and the duplicated data packet to the PHY layer for transmission to UE 115-a. In some cases, base station 105-b may configure a mapping of each logical channel to a particular LBT subchannel or a group of LBT subchannels. This mapping may then be signaled to UE 115-a to be used for receiving and transmitting data packets. Thus, the first logical channel including the original data packet and the second logical channel including the duplicated data packet may be mapped to LBT subchannels based on the configuration. The transmission of the data on multiple LBT subchannels may improve the chances that the data is received by UE 115-b. In the event that the UE 115-b receives both data packets (i.e., the original data packet and the duplicated data packet), the UE 115-b may identify that one of the data packets is a duplicate of the other (e.g., at a PDCP layer), and the UE 115-b may discard the duplicated data packet.

The example described with reference to FIG. 3 relates to packet duplication at a PDCP layer of a wireless device (e.g., a base station 105 or a UE 115). As described herein, in another example, a wireless device may support techniques at a PHY layer for improving the reliability of a data transmission. In particular, a wireless device may duplicate a packet at a PHY layer for transmission on multiple LBT subchannels, or the wireless device may map the packet to multiple LBT subchannels of a carrier for transmission on the multiple LBT subchannels. In some cases, the packets to be transmitted on multiple LBT subchannels may be marked at the PDCP layer for diversity transmission across the multiple LBT subchannels (e.g., using a duplication tag or some other tag). As such, MAC SDUs that are marked for diversity transmission may be aggregated together to form a MAC PDU, and the MAC PDU may be passed to the PHY layer and transmitted on multiple LBT subchannels.

In one aspect, a UE 115 may receive a single PDCCH grant scheduling a downlink transmission (e.g., PDSCH transmission) or an uplink transmission (e.g., PUSCH transmission) across multiple LBT subchannels, and the UE 115 (e.g., for an uplink transmission) or the base station 105 (e.g., for a downlink transmission) may map the packet to the multiple LBT subchannels of a carrier for transmission on the multiple LBT subchannels based on receiving the single PDCCH grant. In an unshared (e.g., licensed) radio frequency spectrum, for transmissions across multiple carriers, transport blocks may be mapped to the carriers in a frequency first, time second manner across multiple carriers or within each carrier. Since the transmissions across multiple carriers may be guaranteed in the unshared radio frequency spectrum, a receiving device may then be able to combine transmissions across the multiple carriers to decode the transport block and identify the data intended for the receiving device.

In a shared radio frequency spectrum (e.g., unlicensed radio frequency spectrum), however, a scheduled transmission on an LBT subchannel may not actually be transmitted if a base station 105 or UE 115 fails to gain access to the LBT subchannel (e.g., based on whether clear channel assessment (CCA) is successful). Thus, a receiving device may not be able to combine transmissions across multiple LBT subchannels to identify the data intended for the receiving device. As described herein, a transmitting device may support efficient techniques for transmitting a packet on multiple LBT subchannels to a receiving device such that the transmission on each LBT subchannel may be self-decodable (i.e., the receiving device may identify the data intended for the receiving device from a transmission on each LBT subchannel).

In one example, the transmitting device may use a low code for a transmission on each LBT subchannel such that most or all of the systematic bits of a packet are transmitted on each LBT subchannel. In another example, the transmitting device may rate match a packet across multiple LBT subchannels such that a transmission on each LBT subchannel is self-decodable. For instance, the transmitting device may rate match redundancy version zero and redundancy version one of a packet to a first LBT subchannel, and the transmitting device may rate match redundancy version zero and redundancy version two of the packet to a second LBT subchannel. For a downlink transmission, PUCCH resources may be assigned to one or more LBT subchannels to be used to acknowledge the same PHY layer transmission (e.g., where a UE 115 may use one or more resources on an LBT subchannel on which a CCA succeeds to send HARQ feedback).

In another aspect, a UE 115 may receive multiple PDCCH grants scheduling downlink transmissions (e.g., PDSCH transmission) or uplink transmissions (e.g., PUSCH transmission) on multiple LBT subchannels (e.g., one PDCCH grant per LBT subchannel), and the UE 115 (e.g., for an uplink transmission) or the base station 105 (e.g., for a downlink transmission) may duplicate a packet at a PHY layer for transmission on the multiple LBT subchannels of a carrier. In this aspect, a receiving device may determine an association between duplicate transmissions across multiple LBT subchannels, and the receiving device may soft-combine the transmissions together to identify the data intended for the receiving device. In some cases, the transmitting device may use a same HARQ ID for transmissions in different LBT subchannels in the same slot. For downlink transmissions, a UE 115 may provide joint HARQ feedback in a single LBT subchannel for the downlink transmissions across the multiple LBT subchannels, or the UE 115 may provide individual HARQ feedback in each LBT subchannel for a corresponding downlink transmission in the LBT subchannel.

Figure 4:
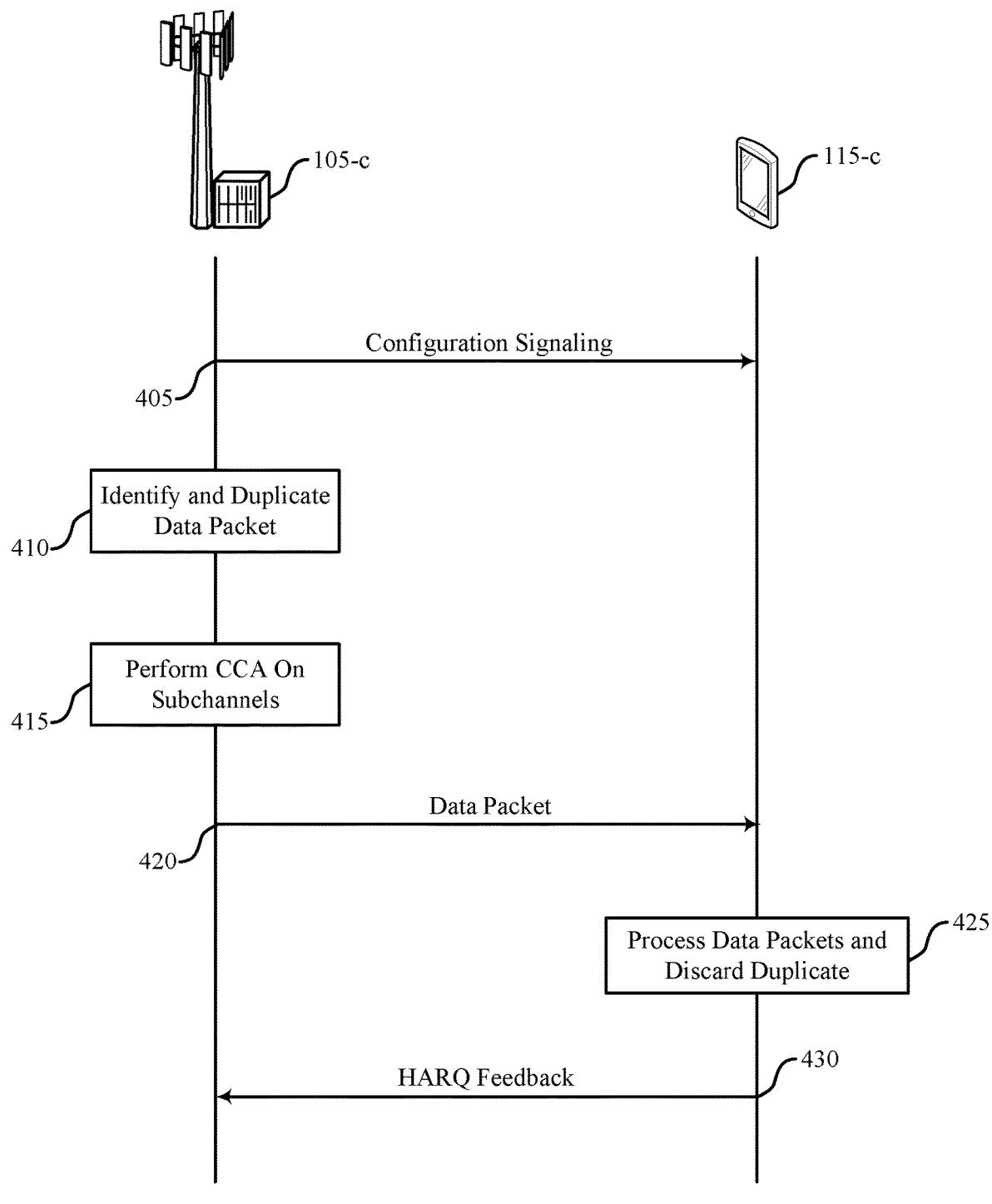
FIGS. 4 and 5 illustrate examples of process flows in accordance with aspects of the present disclosure.

FIG. 4 illustrates an example of a process flow 400 in accordance with aspects of the present disclosure. Process flow 400 illustrates aspects of techniques performed by a base station 105-*b*, which may be an example of a base station 105 described with reference to FIGS. 1-3. Process flow 400 also illustrates aspects of techniques performed by UE 115-*b*, which may be an example of a UE 115 described with reference to FIGS. 1-3. Although the example described with reference to FIG. 4 relates to a downlink transmission from a base station 105-*c* to a UE 115-*c*, it is to be understood that the same or similar techniques may be applied for an uplink transmission from the UE 115-*c* to the base station 105-*c*. Further, although the example described with reference to FIG. 4 relates to generating one or two duplicates of a data packet for transmission on multiple subchannels, it is to be understood that any number of duplicates of a data packet may be generated for transmission on any number of subchannels.

At 405, base station 105-*c* may transmit configuration signaling to UE 115-*c* indicating a mapping of a first logical channel to a first subchannel (e.g., first LBT subchannel or first bandwidth part in a shared radio frequency spectrum) of a carrier and a second logical channel to a second subchannel (e.g., second LBT subchannel or second bandwidth part in a shared radio frequency spectrum) of a carrier. In some cases, the configuration signaling may also indicate a prohibited subchannel of the carrier. The mapping of logical channels to subchannels may be used by UE 115-*c* for receiving a downlink transmission using the techniques described herein (as shown) or for transmitting an uplink transmission using the techniques described herein (not shown).

At 410, base station 105-*c* may identify and duplicate a data packet for transmission to UE 115-*c*. In particular, the base station 105-*c* may generate a data packet (e.g., a first data packet) for the first logical channel (e.g., a first PDCP PDU generated from an IP packet) and a duplicate of the data packet (e.g., a second data packet) for the second logical channel (e.g., a second PDCP PDU generated from the same IP packet). In some cases, the base station 105 may generate another duplicate of the data packet (e.g., a third data packet) for a third logical channel of the carrier (e.g., where the configuration signaling indicates a mapping of the third logical channel to a third subchannel of the carrier).

At 415, base station 105-*c* may perform a first LBT procedure on the first subchannel prior to transmitting the first data packet, and base station 105-*c* may perform a second LBT procedure on the second subchannel prior to transmitting the second data packet. In some cases, base station 105-*c* may determine that the first and second subchannels are clear (e.g., based on the LBT procedures), and, at 420, base station 105-*c* may transmit the first data packet mapped to the first logical channel via the first subchannel, and the base station 105-*c* may transmit the second data packet mapped to the second logical channel via the second subchannel (e.g., based on the mapping of logical channels to subchannels indicated by the configuration signaling at 405).

At 420, UE 115-*c* may receive the first data packet on the first subchannel, the second data packet on the second subchannel, or both the first and second data packets on the first and second subchannels, and, at 425, UE 115-*c* may process the first data packet, the second data packet, or both. If UE 115-*c* receives both the first and second data packets, UE 115-*c* may identify one of the data packets as a duplicate of the other (e.g., at a PDCP layer), and the UE 115-*c* may discard the duplicated data packet (e.g., at a PDCP layer). At 430, UE 115-*c* may then provide HARQ feedback for the data packets. In one example, base station 105-*c* may allocate PUCCH resources to UE 115-*c* on one or more subchannels for UE 115-*c* to provide HARQ feedback to base station 105-*c*. In this example, UE 115-*c* may provide HARQ feedback on one or more subchannels on which CCAs are successful.

Figure 5:
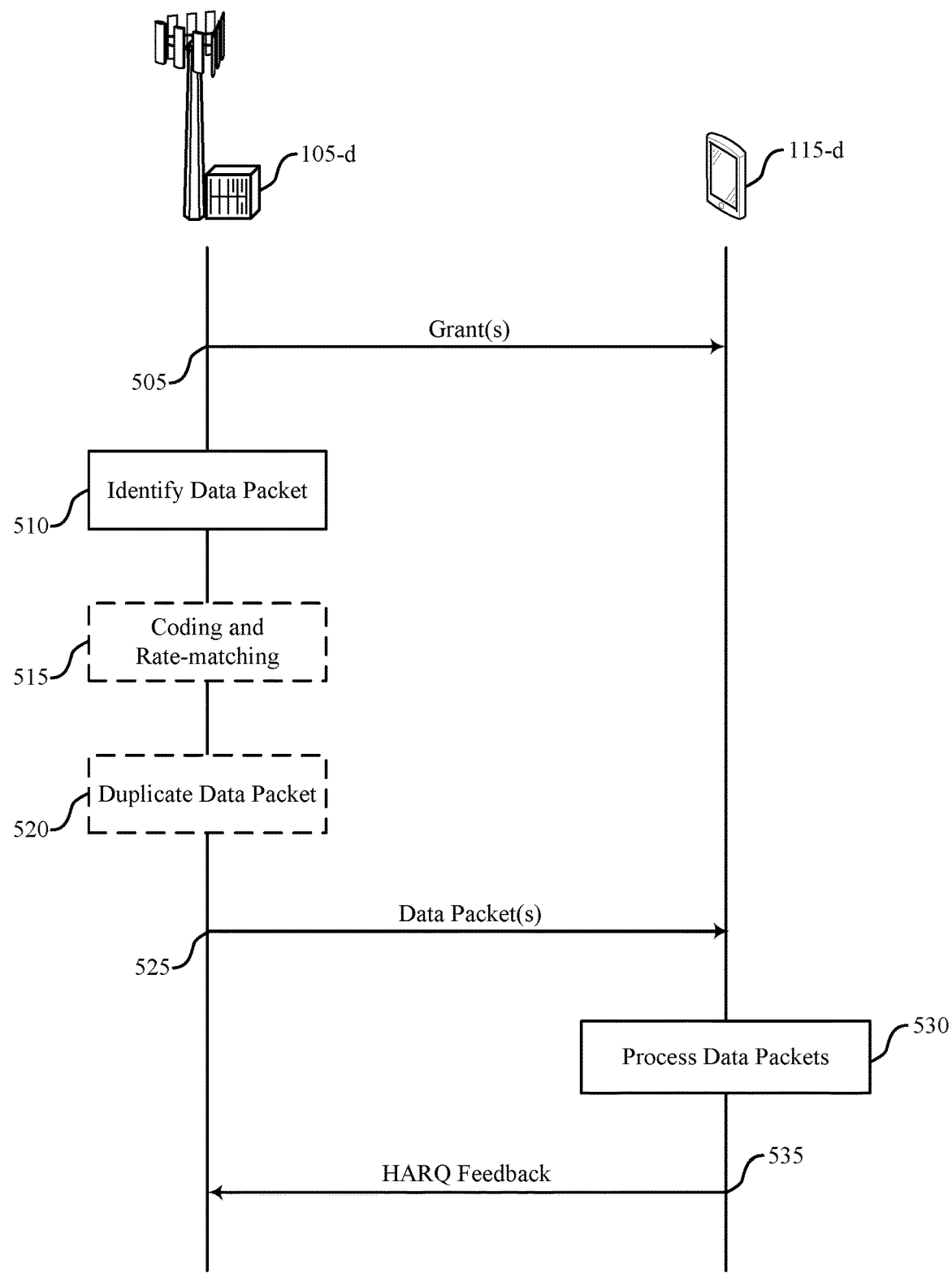

FIG. 5 illustrates an example of a process flow 500 in accordance with aspects of the present disclosure. Process flow 500 illustrates aspects of techniques performed by a base station 105-*c*, which may be an example of a base station 105 described with reference to FIGS. 1-4. Process flow 500 also illustrates aspects of techniques performed by UE 115-*c*, which may be an example of a UE 115 described with reference to FIGS. 1-4. Although the example described with reference to FIG. 5 relates to a downlink transmission from a base station 105-*d* to a UE 115-*d*, it is to be understood that the same or similar techniques may be applied for an uplink transmission from the UE 115-*d* to the base station 105-*d*. Further, although the example described with reference to FIG. 5 relates to transmitting on two subchannels, it is to be understood that a wireless device may transmit on any number of subchannels using these techniques.

At 505, base station 105-*d* may transmit one or more grants to UE 115-*d* scheduling transmission of a data packet in a first subchannel and a second subchannel of a carrier. At 510, base station 105-*d* may identify the data packet (e.g., a PHY layer data packet processed and passed down to the PHY layer from upper layers) to be transmitted to UE 115-*d*. In one example, base station 105-*d* may transmit a single grant to schedule transmission of the data packet on multiple subchannels, and, at 515, base station 105-*d* may perform coding and rate matching to improve the reliability of transmission of the data packet. In this example, the base station 105-*d* may use a low code for the transmission on each subchannel (e.g., a code rate equal to ⅓* the number of subchannels to be used to transmit the data packet) such that most or all of the systematic bits of the data packet are transmitted on each LBT subchannel.

Additionally, or alternatively, the base station 105-*d* may rate match the data packet across multiple subchannels such that the transmission on each subchannel is self-decodable. For instance, base station 105-*d* may rate match a first transmission of the data packet to generate a rate matched first transmission based on a rate matching scheme (e.g., signaled to UE 115-*d* in configuration signaling), and the base station 105-*d* may rate match a second transmission of the data packet to generate a rate matched second transmission based on the rate matching scheme. In some cases, the rate matching scheme may indicate that the rate matched first transmission includes a first redundancy version generated from the data packet and at least a portion of a second redundancy version generated from the data packet. Further, the rate matching scheme may indicate that the rate matched second transmission includes the first redundancy version generated from the first data packet and at least a portion of a third redundancy version generated from the first data packet, the second redundancy version differing from the third redundancy version.

In another example, base station 105-*d* may transmit multiple grants to schedule transmission of the data packet on multiple subchannels, and, at 520, base station 105-*d* may duplicate the data packet for transmission on each of the multiple subchannels to improve the reliability of transmission of the data packet. Once the base station 105-*d* performs coding and rate matching on the data packet to improve reliability (at 515) or the base station 105-*d* duplicates the data packet to improve reliability, the base station 105-*d* may perform an LBT procedure on each of the multiple subchannels to determine whether the subchannels are available. At 525, the base station 105-*d* may then transmit the one or more data packets on the multiple subchannels to UE 115-*d* (if the channels are available). At 530, UE 115-*d* may receive the transmission and process the one or more data packets to identify the data intended for the UE 115-*d*.

If the data packet was coded using the techniques described herein and transmitted on multiple subchannels to improve reliability, UE 115-*d* may identify a code rate used for coding the data packet (e.g., based on configuration signaling from base station 105-*d* that indicates the coding rate), and UE 115-*d* may decode the transmission of the one or more data packets based on the code rate to identify the data intended for the UE 115-*d*. If the data packet was rate matched using the techniques described herein and transmitted on multiple subchannels to improve reliability, UE 115-*d* may identify a rate matching scheme used to rate match transmissions of the data packet (e.g., based on configuration signaling from base station 105-*d* that indicates the rate matching scheme), and UE 115-*d* may de-rate match the transmissions based on the rate matching scheme used to rate match the transmissions to identify the data intended for the UE 115-*d*.

For example, UE 115-*d* may de-rate match the first transmission to generate a de-rate matched first transmission based on the rate matching scheme, and UE 115-*d* may de-rate match the second transmission to generate a de-rate matched second transmission based on the rate matching scheme. UE 115-*d* may then apply a decoding algorithm to the de-rate matched first transmission, the de-rate matched second transmission, or both. In some cases, the rate matching scheme may indicate that the de-rate matched first transmission includes a first redundancy version generated from the first data packet and at least a portion of a second redundancy version generated from the first data packet. Further, the rate matching scheme may indicate that the de-rate matched second transmission includes the first redundancy version of the first data packet and at least a portion of a third redundancy version of the first data packet, the second redundancy version differing from the third redundancy version.

If the data packet was duplicated using the techniques described herein and transmitted on multiple subchannels to improve reliability, UE 115-*d* may determine an association between a first transmission of the data packet and a second transmission of the data packet based on individual grants received for each transmission, and UE 115-*d* may soft combine the first transmission and the second transmission to decode the data packet based on the association. In some cases, UE 115-*d* may identify a common feedback identifier for the first subchannel of the carrier and the second subchannel of the carrier within a same TTI, where the first transmission and the second transmission each correspond to the common feedback identifier.

At 535, the UE 115-*d* may then provide HARQ feedback to base station 105-*d* for the one or more data packets. In some cases, if different grants are used to schedule a first transmission of a data packet on a first subchannel and a second transmission of the same data packet second subchannel, UE 115-*d* may transmit a joint feedback message via the first subchannel, the second subchannel, or both, to provide joint feedback on the first transmission and the second transmission. Alternatively, UE 115-*d* may transmit a first feedback message via the first subchannel of the carrier to provide feedback on the first transmission and a second feedback message via the second subchannel of the carrier to provide feedback on the second transmission. In other cases, if a same grant is used to schedule transmissions of a data packet on multiple subchannels, base station 105-*d* may transmit configuration signaling indicating at least one feedback resource for the first subchannel, the second subchannel, or both, and UE 115-*d* may transmit a feedback message via the at least one feedback resource (e.g., depending on whether CCA is successful on a subchannel).

Figure 6:
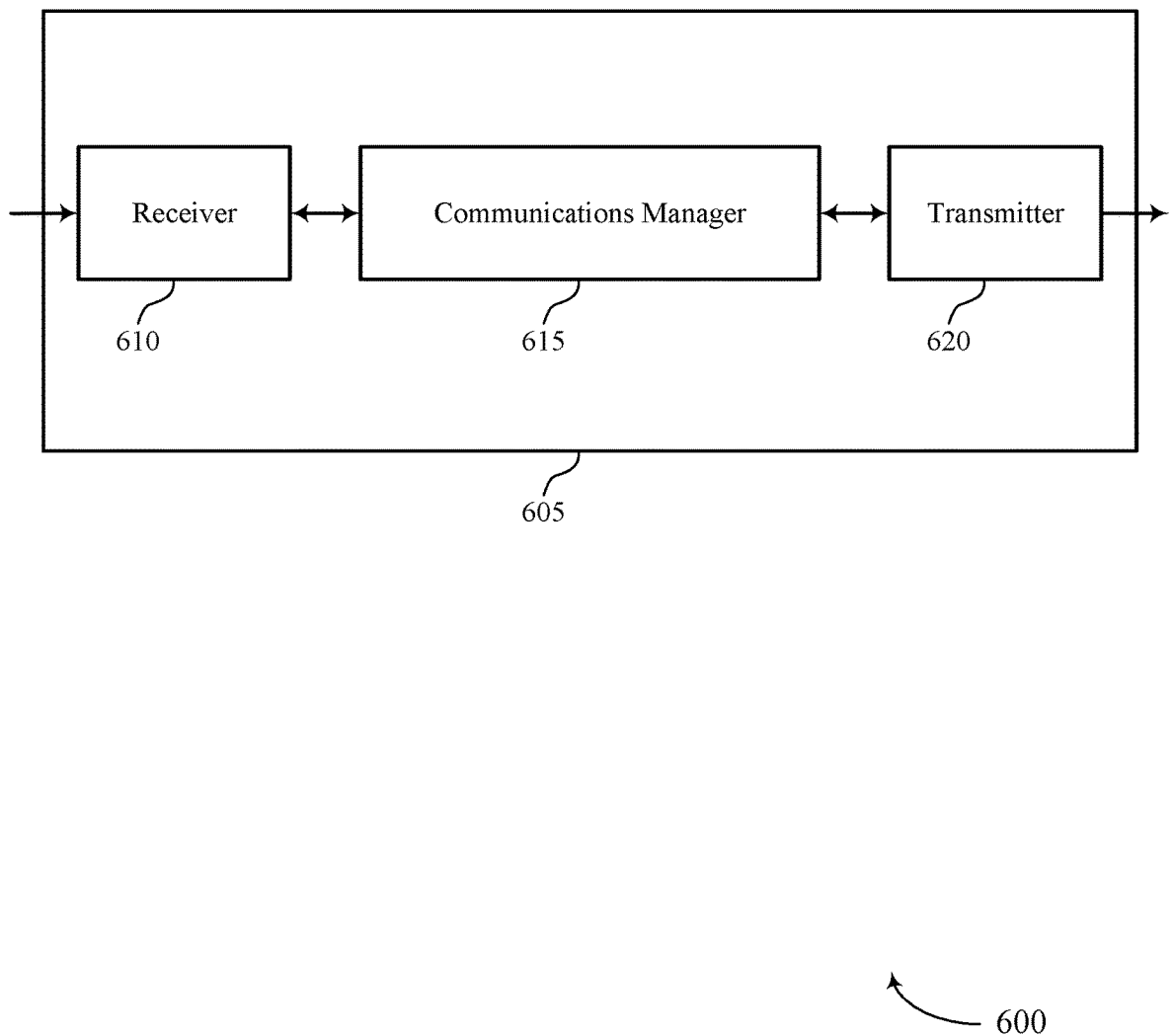
FIGS. 6 and 7 show block diagrams of devices in accordance with aspects of the present disclosure.

FIG. 6 shows a block diagram 600 of a device 605 in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to packet duplication for high reliability communication, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive configuration signaling indicating a mapping of a first logical channel to a first subchannel of a carrier and a second logical channel to a second subchannel of the carrier and transmit or receiving a transmission of a first data packet via the first subchannel of the carrier and a duplicate of the transmission associated with the second logical channel via the second subchannel of the carrier based on the mapping. The communications manager 615 may also receive one or more grants scheduling transmission of a first data packet in a first sub channel and a second subchannel of a carrier and transmit or receiving the transmission via the first subchannel and the second subchannel of the carrier based on the one or more grants. The communications manager 615 may be an example of aspects of the communications manager 910 described herein.

The actions performed by the communications manager 615 as described herein may be implemented to realize one or more potential advantages. One implementation may allow device 605 to transmit multiple versions (e.g., same or different versions) of the same high reliability packet on multiple LBT subchannels to increase the chances that the high reliability packet is received by a receiving device. In this implementation, the receiving device (e.g., which may, in some examples, be device 605) may receive the high reliability packet on the multiple LBT subchannels. In some cases, the device 605 may also process a high reliability packet for transmission such that each high reliability packet transmitted on an LBT subchannel is self-decodable. Accordingly, if a receiving device fails to receive a high reliability packet on one subchannel, the receiving device may receive a duplicate of the high reliability packet on another subchannel and be able to decode to duplicate of the high reliability packet. In such cases, a processor at the receiving device may efficiently use its processing power to decode high reliability packets received from another device on one or more LBT subchannels.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
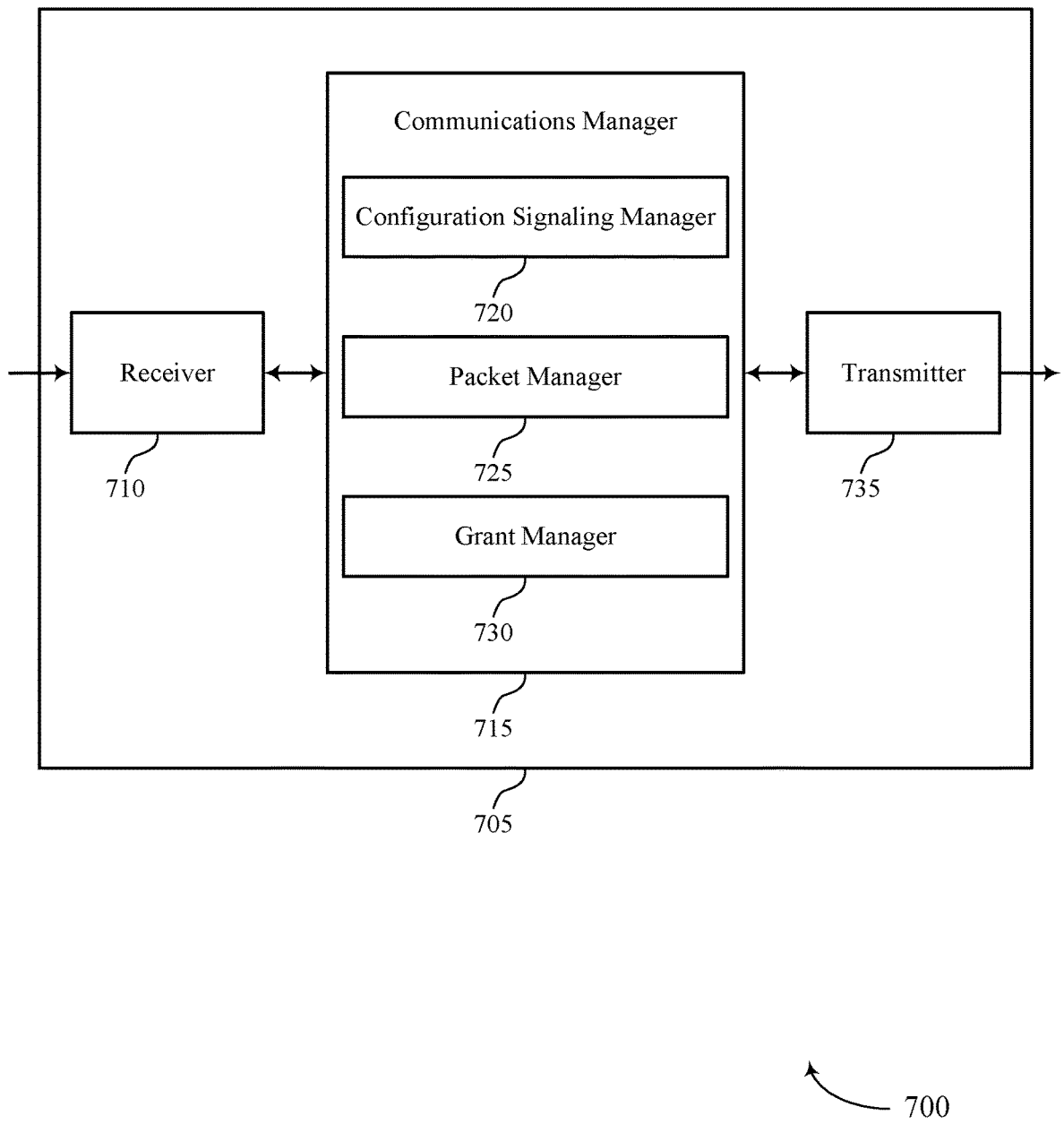

FIG. 7 shows a block diagram 700 of a device 705 in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to packet duplication for high reliability communication, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a configuration signaling manager 720, a packet manager 725, and a grant manager 730. The communications manager 715 may be an example of aspects of the communications manager 910 described herein.

The configuration signaling manager 720 may receive configuration signaling indicating a mapping of a first logical channel to a first subchannel of a carrier and a second logical channel to a second subchannel of the carrier. The packet manager 725 may transmit or receiving a transmission of a first data packet via the first subchannel of the carrier and a duplicate of the transmission associated with the second logical channel via the second subchannel of the carrier based on the mapping. The grant manager 730 may receive one or more grants scheduling transmission of a first data packet in a first subchannel and a second subchannel of a carrier. The packet manager 725 may transmit or receiving the transmission via the first subchannel and the second subchannel of the carrier based on the one or more grants.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
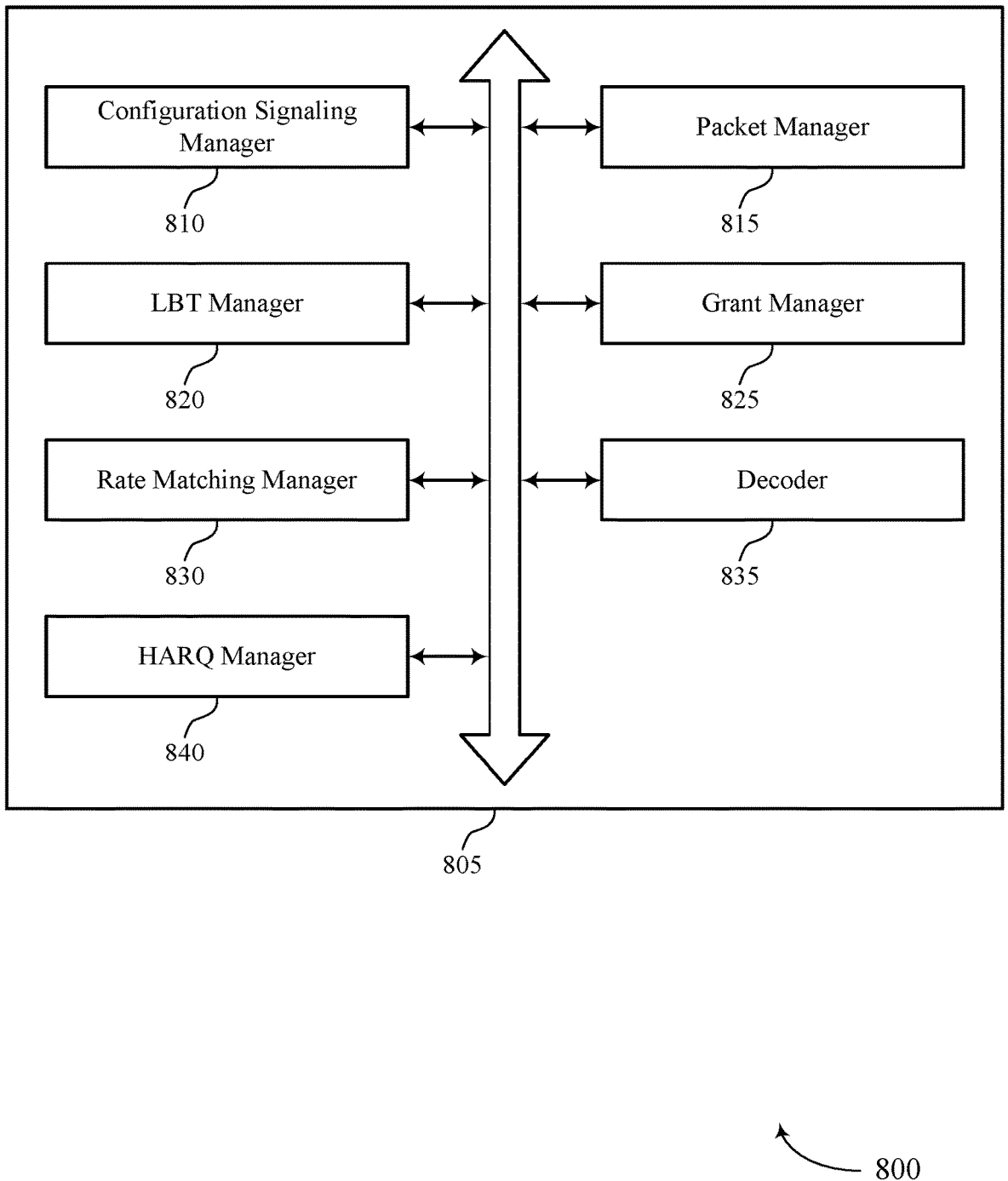
FIG. 8 shows a block diagram of a communications manager in accordance with aspects of the present disclosure.

FIG. 8 shows a block diagram 800 of a communications manager 805 in accordance with aspects of the present disclosure. The communications manager 805 may be an example of aspects of a communications manager 615, a communications manager 715, or a communications manager 910 described herein. The communications manager 805 may include a configuration signaling manager 810, a packet manager 815, a LBT manager 820, a grant manager 825, a rate matching manager 830, a decoder 835, and a HARQ manager 840. Each of these modules may communicate, directly or indirectly, with one another (e.g., via one or more buses).

The configuration signaling manager 810 may receive configuration signaling indicating a mapping of a first logical channel to a first subchannel of a carrier and a second logical channel to a second subchannel of the carrier. In some examples, the configuration signaling manager 810 may receive the configuration signaling indicating a prohibited subchannel of the carrier. In some examples, the configuration signaling manager 810 may receive configuration signaling indicating a rate matching scheme. In some examples, the configuration signaling manager 810 may receive configuration signaling indicating a code rate.

In some examples, the configuration signaling manager 810 may receive configuration signaling indicating at least one feedback resource for the first subchannel, the second subchannel, or both. In some cases, each of the first subchannel and the second subchannel is a different listen before talk subchannel of the carrier. In some cases, each of the first subchannel and the second subchannel is a different bandwidth part of the carrier. In some cases, the first logical channel is associated with a first channel identifier that differs from a second channel identifier of the second logical channel. In some cases, the code rate is smaller than ⅓ of a number of subchannels to which transmissions of the first data packet are mapped.

The packet manager 815 may transmit or receiving a transmission of a first data packet via the first subchannel of the carrier and a duplicate of the transmission associated with the second logical channel via the second subchannel of the carrier based on the mapping. In some examples, the packet manager 815 may transmit or receiving the transmission via the first subchannel and the second subchannel of the carrier based on the one or more grants. In some examples, generating a first data packet for the first logical channel and a duplicate first data packet for the second logical channel, where the transmitting or receiving further includes.

In some examples, the packet manager 815 may transmit or receiving a second duplicate of the transmission via the third subchannel of the carrier based on the second mapping. In some examples, the packet manager 815 may receive a first transmission of the first data packet via the first subchannel of the carrier and a second transmission of the first data packet via the second subchannel of the carrier. In some examples, the packet manager 815 may transmit the rate matched first transmission via the first subchannel of the carrier and the rate matched second transmission via the second subchannel of the carrier. In some examples, the packet manager 815 may generate the first data packet to include a duplication tag.

In some examples, generating a first transmission including the first packet and a second transmission including the first data packet based on the duplication tag, where the transmitting or receiving further includes. In some examples, the packet manager 815 may receive a first transmission of the first data packet via the first subchannel of the carrier and a second transmission of the first data packet via the second subchannel of the carrier, where each of the first transmission and the second transmission is self-decodable. In some cases, the first data packet is a PDCP packet. In some cases, the first data packet is a MAC-SDU. In some cases, the first data packet is a PDCP packet.

The grant manager 825 may receive one or more grants scheduling transmission of a first data packet in a first subchannel and a second subchannel of a carrier. In some examples, the grant manager 825 may receive a first grant scheduling a first transmission of the first data packet via the first subchannel of the carrier and a second grant scheduling a second transmission of the first data packet via the second subchannel of the carrier. In some cases, each of the first subchannel and the second subchannel is a different listen before talk subchannel of the carrier. In some cases, each of the first subchannel and the second subchannel is a different bandwidth part of the carrier.

The LBT manager 820 may perform a first listen before talk procedure on the first subchannel prior to transmitting the transmission. In some examples, the LBT manager 820 may perform a second listen before talk procedure on the second subchannel prior to transmitting the duplicate of the transmission.

The rate matching manager 830 may de-rate matching the first transmission to generate a de-rate matched first transmission based on the rate matching scheme. In some examples, the rate matching manager 830 may de-rate matching the second transmission to generate a de-rate matched second transmission based on the rate matching scheme. In some examples, the rate matching manager 830 may rate matching a first transmission of the first data packet to generate a rate matched first transmission based on the rate matching scheme. In some examples, the rate matching manager 830 may rate matching a second transmission of the first data packet to generate a rate matched second transmission based on the rate matching scheme.

In some cases, the rate matching scheme indicates that the de-rate matched first transmission includes a first redundancy version generated from the first data packet and at least a portion of a second redundancy version generated from the first data packet. In some cases, the rate matching scheme indicates that the de-rate matched second transmission includes the first redundancy version of the first data packet and at least a portion of a third redundancy version of the first data packet, the second redundancy version differing from the third redundancy version. In some cases, the rate matching scheme indicates that the rate matched first transmission includes a first redundancy version generated from the first data packet and at least a portion of a second redundancy version generated from the first data packet. In some cases, the rate matching scheme indicates that the rate matched second transmission includes the first redundancy version generated from the first data packet and at least a portion of a third redundancy version generated from the first data packet, the second redundancy version differing from the third redundancy version.

The decoder 835 may apply a decoding algorithm to the de-rate matched first transmission, the de-rate matched second transmission, or both. In some examples, the decoder 835 may decode the transmission based on the code rate. In some examples, the decoder 835 may determine an association between the first transmission and the second transmission based on the first grant and the second grant. In some examples, the decoder 835 may soft combine the first transmission and the second transmission to decode the first data packet based on the association.

The HARQ manager 840 may identify a common feedback identifier for the first subchannel of the carrier and the second subchannel of the carrier within a same transmission time interval, where the first transmission and the second transmission each correspond to the common feedback identifier. In some examples, the HARQ manager 840 may transmit a joint feedback message via the first subchannel, the second subchannel, or both, to provide joint feedback on the first transmission and the second transmission.

In some examples, the HARQ manager 840 may transmit a first feedback message via the first subchannel of the carrier to provide feedback on the first transmission and a second feedback message via the second subchannel of the carrier to provide feedback on the second transmission. In some examples, the HARQ manager 840 may transmit, via the at least one feedback resource, a feedback message. In some examples, the HARQ manager 840 may receive a first transmission of the first data packet via the first subchannel of the carrier and a second transmission of the first data packet via the second subchannel of the carrier, where the feedback message is a joint feedback message that provides feedback for the first transmission and the second transmission.

Figure 9:
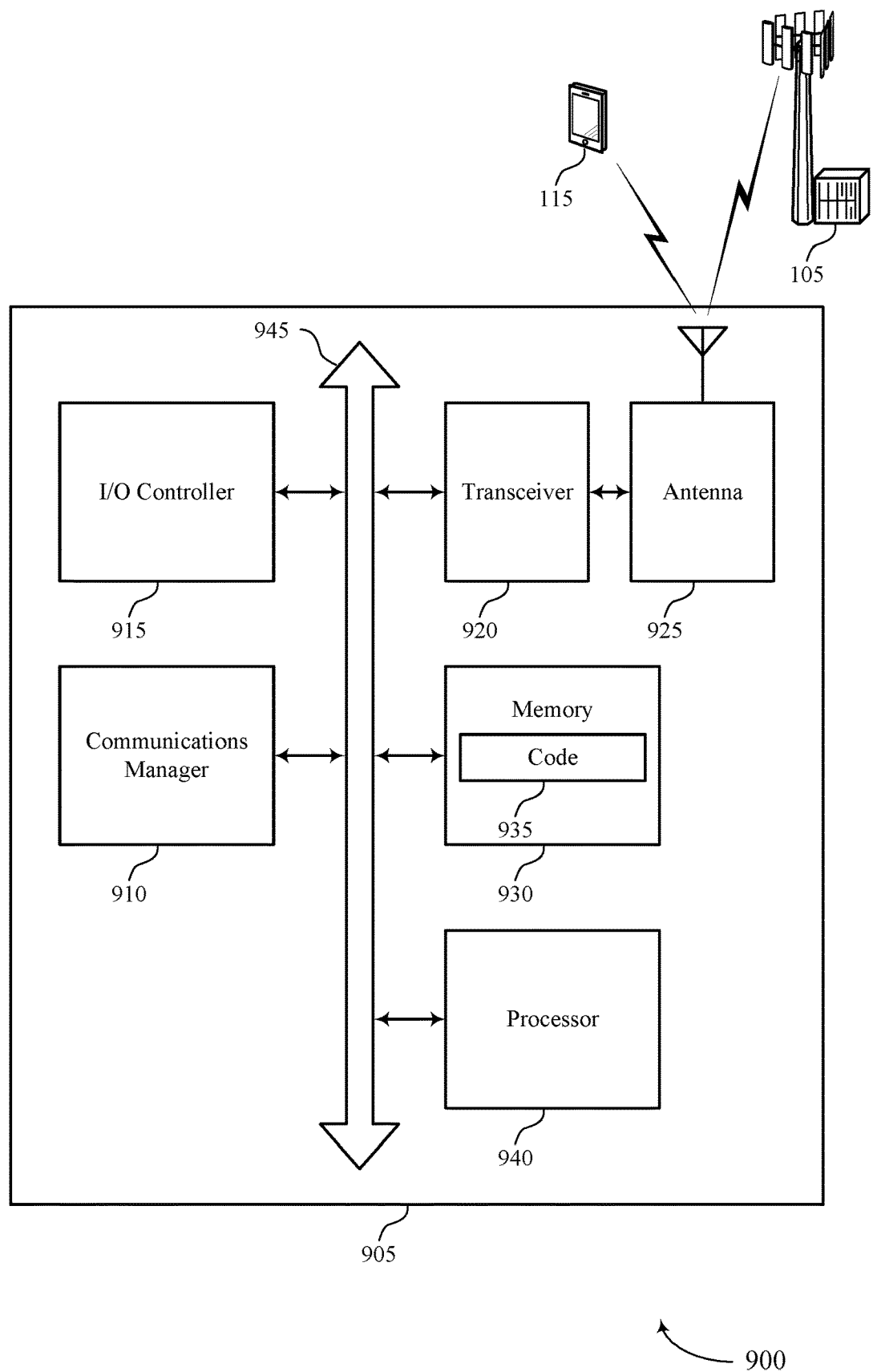
FIG. 9 shows a diagram of a system including a device in accordance with aspects of the present disclosure.

FIG. 9 shows a diagram of a system 900 including a device 905 in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive configuration signaling indicating a mapping of a first logical channel to a first subchannel of a carrier and a second logical channel to a second subchannel of the carrier and transmit or receiving a transmission of a first data packet via the first subchannel of the carrier and a duplicate of the transmission associated with the second logical channel via the second subchannel of the carrier based on the mapping. The communications manager 910 may also receive one or more grants scheduling transmission of a first data packet in a first subchannel and a second subchannel of a carrier and transmit or receiving the transmission via the first subchannel and the second subchannel of the carrier based on the one or more grants.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting packet duplication for high reliability communication).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
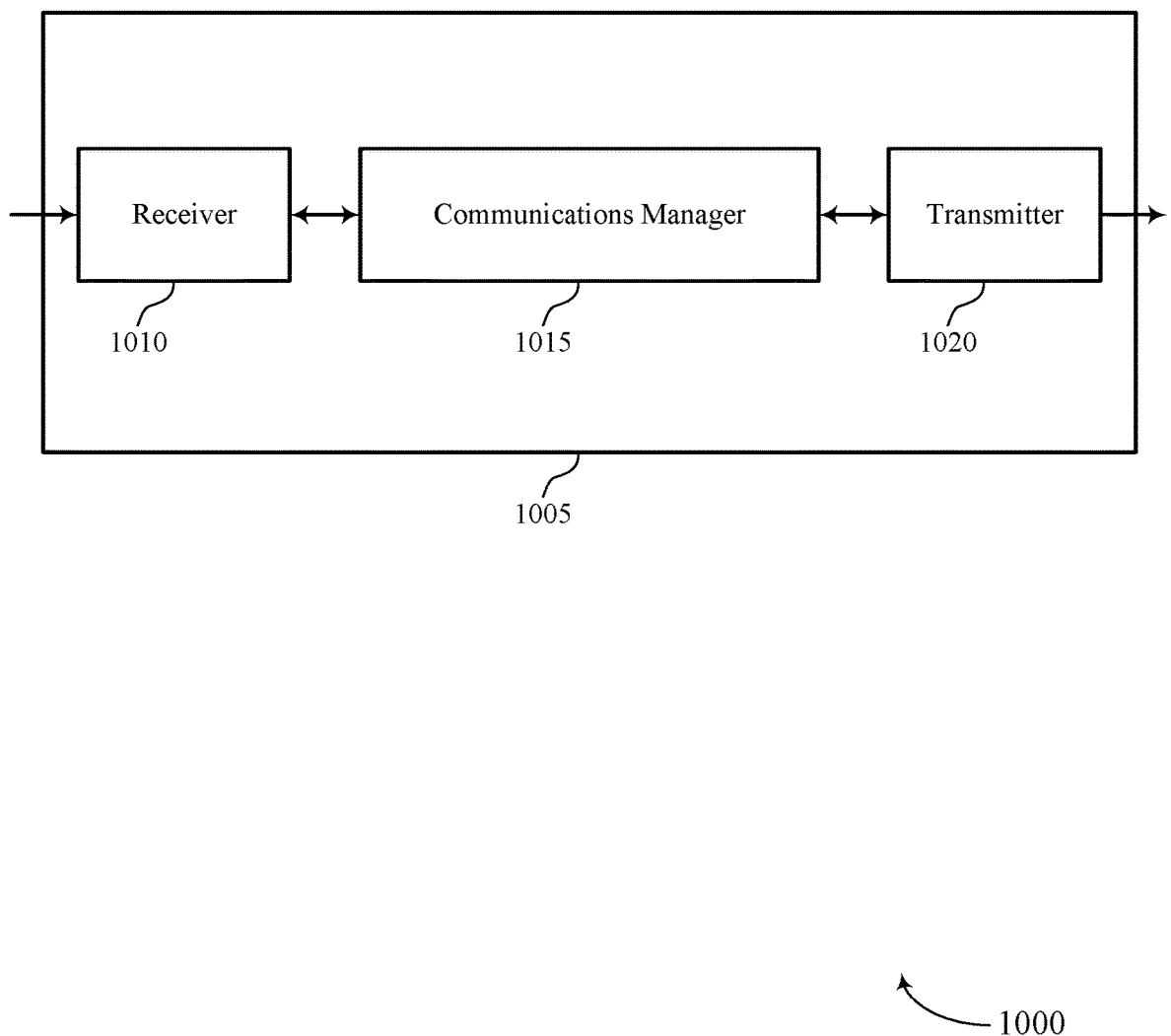
FIGS. 10 and 11 show block diagrams of devices in accordance with aspects of the present disclosure.

FIG. 10 shows a block diagram 1000 of a device 1005 in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to packet duplication for high reliability communication, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit configuration signaling indicating a mapping of a first logical channel to a first subchannel of a carrier and a second logical channel to a second subchannel of the carrier and transmit or receiving a transmission of a first data packet via the first subchannel of the carrier and a duplicate of the transmission associated with the second logical channel via the second subchannel of the carrier based on the mapping. The communications manager 1015 may also transmit one or more grants scheduling transmission of a first data packet in a first subchannel and a second subchannel of a carrier and transmit or receiving the transmission via the first subchannel and the second subchannel of the carrier based on the one or more grants. The communications manager 1015 may be an example of aspects of the communications manager 1310 described herein.

The actions performed by the communications manager 1015 as described herein may be implemented to realize one or more potential advantages. One implementation may allow device 1005 to transmit multiple versions (e.g., same or different versions) of the same high reliability packet on multiple LBT subchannels to increase the chances that the high reliability packet is received by a receiving device. In this implementation, the receiving device (e.g., which may, in some examples, be device 1005) may receive the high reliability packet on the multiple LBT subchannels. In some cases, the device 1005 may also process a high reliability packet for transmission such that each high reliability packet transmitted on an LBT subchannel is self-decodable. Accordingly, if a receiving device fails to receive a high reliability packet on one subchannel, the receiving device may receive a duplicate of the high reliability packet on another subchannel and be able to decode to duplicate of the high reliability packet. In such cases, a processor at the receiving device may efficiently use its processing power to decode high reliability packets received from another device on one or more LBT subchannels.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
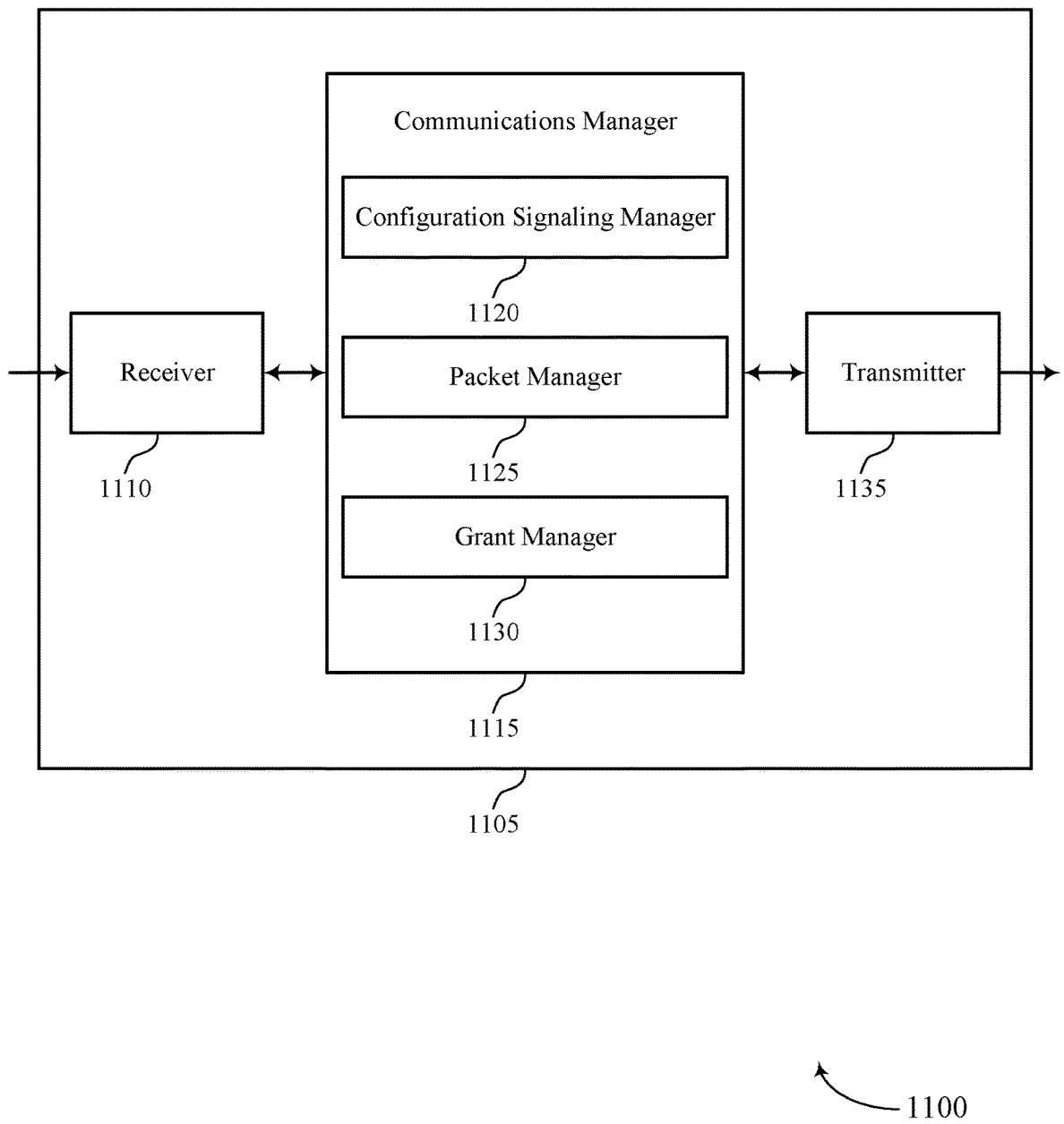

FIG. 11 shows a block diagram 1100 of a device 1105 in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to packet duplication for high reliability communication, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configuration signaling manager 1120, a packet manager 1125, and a grant manager 1130. The communications manager 1115 may be an example of aspects of the communications manager 1310 described herein.

The configuration signaling manager 1120 may transmit configuration signaling indicating a mapping of a first logical channel to a first subchannel of a carrier and a second logical channel to a second subchannel of the carrier. The packet manager 1125 may transmit or receiving a transmission of a first data packet via the first subchannel of the carrier and a duplicate of the transmission associated with the second logical channel via the second subchannel of the carrier based on the mapping. The grant manager 1130 may transmit one or more grants scheduling transmission of a first data packet in a first subchannel and a second subchannel of a carrier. The packet manager 1125 may transmit or receiving the transmission via the first subchannel and the second subchannel of the carrier based on the one or more grants.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
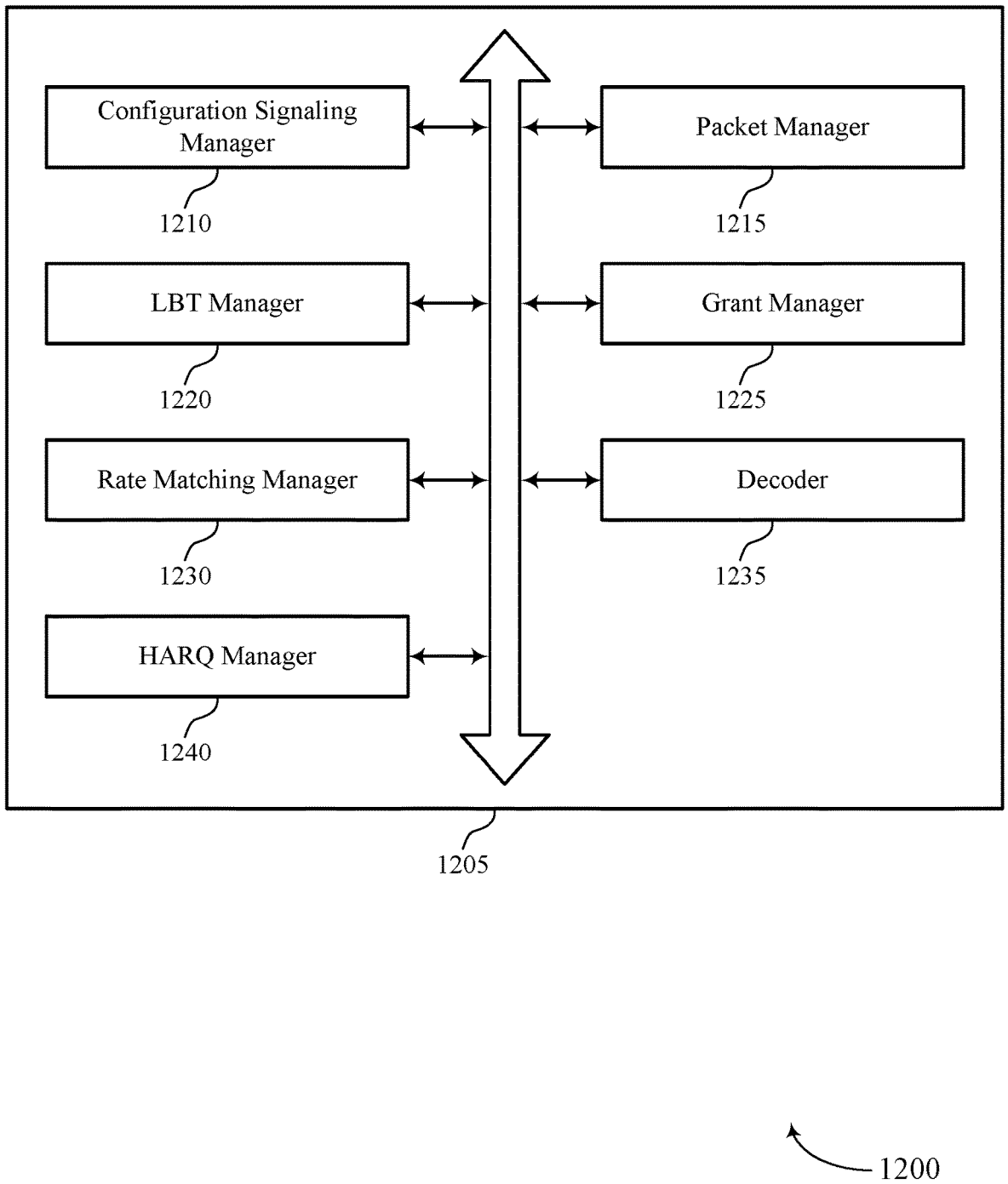
FIG. 12 shows a block diagram of a communications manager in accordance with aspects of the present disclosure.

FIG. 12 shows a block diagram 1200 of a communications manager 1205 in accordance with aspects of the present disclosure. The communications manager 1205 may be an example of aspects of a communications manager 1015, a communications manager 1115, or a communications manager 1310 described herein. The communications manager 1205 may include a configuration signaling manager 1210, a packet manager 1215, a LBT manager 1220, a grant manager 1225, a rate matching manager 1230, a decoder 1235, and a HARQ manager 1240. Each of these modules may communicate, directly or indirectly, with one another (e.g., via one or more buses).

The configuration signaling manager 1210 may transmit configuration signaling indicating a mapping of a first logical channel to a first subchannel of a carrier and a second logical channel to a second subchannel of the carrier. In some examples, the configuration signaling manager 1210 may transmit the configuration signaling indicating a prohibited subchannel of the carrier. In some examples, the configuration signaling manager 1210 may transmit configuration signaling indicating a rate matching scheme. In some examples, the configuration signaling manager 1210 may transmit configuration signaling indicating a code rate. In some examples, the configuration signaling manager 1210 may transmit configuration signaling indicating at least one feedback resource for the first subchannel, the second subchannel, or both.

In some cases, each of the first subchannel and the second subchannel is a different listen before talk subchannel of the carrier. In some cases, each of the first subchannel and the second subchannel is a different bandwidth part of the carrier. In some cases, the first logical channel is associated with a first channel identifier that differs from a second channel identifier of the second logical channel. In some cases, the code rate is smaller than ⅓ of a number of subchannels to which transmissions of the first data packet are mapped. In some cases, each of the first subchannel and the second subchannel is a different listen before talk subchannel of the carrier. In some cases, each of the first subchannel and the second subchannel is a different bandwidth part of the carrier.

The packet manager 1215 may transmit or receiving a transmission of a first data packet via the first subchannel of the carrier and a duplicate of the transmission associated with the second logical channel via the second subchannel of the carrier based on the mapping. In some examples, the packet manager 1215 may transmit or receiving the transmission via the first subchannel and the second subchannel of the carrier based on the one or more grants. In some examples, generating a first data packet for the first logical channel and a duplicate first data packet for the second logical channel, where the transmitting or receiving further includes.

In some examples, the packet manager 1215 may transmit or receiving a second duplicate of the transmission via the third subchannel of the carrier based on the second mapping. In some examples, the packet manager 1215 may receive a first transmission of the first data packet via the first subchannel of the carrier and a second transmission of the first data packet via the second subchannel of the carrier. In some examples, the packet manager 1215 may transmit the rate matched first transmission via the first subchannel of the carrier and the rate matched second transmission via the second subchannel of the carrier. In some examples, the packet manager 1215 may generate the first data packet to include a duplication tag. In some examples, generating a first transmission including the first packet and a second transmission including the first data packet based on the duplication tag, where the transmitting or receiving further includes.

In some examples, the packet manager 1215 may transmit a first transmission of the first data packet via the first subchannel of the carrier and a second transmission of the first data packet via the second subchannel of the carrier, where each of the first transmission and the second transmission is self-decodable. In some cases, the first data packet is a PDCP packet. In some cases, the first data packet is a MAC-SDU. In some cases, the first data packet is a PDCP packet. The grant manager 1225 may transmit one or more grants scheduling transmission of a first data packet in a first subchannel and a second subchannel of a carrier. In some examples, the grant manager 1225 may transmit a first grant scheduling a first transmission of the first data packet via the first subchannel of the carrier and a second grant scheduling a second transmission of the first data packet via the second subchannel of the carrier.

The LBT manager 1220 may perform a listen before talk procedure on each of the each of the first subchannel and the second subchannel prior to transmitting the transmission and the duplicate of the transmission. The rate matching manager 1230 may de-rate matching the first transmission to generate a de-rate matched first transmission based on the rate matching scheme. In some examples, the rate matching manager 1230 may de-rate matching the second transmission to generate a de-rate matched second transmission based on the rate matching scheme. In some examples, the rate matching manager 1230 may rate matching a first transmission of the first data packet to generate a rate matched first transmission based on the rate matching scheme. In some examples, the rate matching manager 1230 may rate matching a second transmission of the first data packet to generate a rate matched second transmission based on the rate matching scheme.

In some cases, the rate matching scheme indicates that the de-rate matched first transmission includes a first redundancy version generated from the first data packet and at least a portion of a second redundancy version generated from the first data packet. In some cases, the rate matching scheme indicates that the de-rate matched second transmission includes the first redundancy version of the first data packet and at least a portion of a third redundancy version of the first data packet, the second redundancy version differing from the third redundancy version. In some cases, the rate matching scheme indicates that the rate matched first transmission includes a first redundancy version generated from the first data packet and at least a portion of a second redundancy version generated from the first data packet. In some cases, the rate matching scheme indicates that the rate matched second transmission includes the first redundancy version generated from the first data packet and at least a portion of a third redundancy version generated from the first data packet, the second redundancy version differing from the third redundancy version.

The decoder 1235 may apply a decoding algorithm to the de-rate matched first transmission, the de-rate matched second transmission, or both. In some examples, the decoder 1235 may decode the transmission based on the code rate. In some examples, the decoder 1235 may determine an association between the first transmission and the second transmission based on the first grant and the second grant. In some examples, the decoder 1235 may soft combine the first transmission and the second transmission to decode the first data packet based on the association.

The HARQ manager 1240 may identify a common feedback identifier for the first subchannel of the carrier and the second subchannel of the carrier within a same transmission time interval, where the first transmission and the second transmission each correspond to the common feedback identifier. In some examples, the HARQ manager 1240 may receive a joint feedback message via the first subchannel, the second subchannel, or both, that provides joint feedback on the first transmission and the second transmission.

In some examples, the HARQ manager 1240 may receive a first feedback message via the first subchannel of the carrier that provides feedback on the first transmission and a second feedback message via the second subchannel of the carrier that provides feedback on the second transmission. In some examples, the HARQ manager 1240 may receive, via the at least one feedback resource, a feedback message. In some examples, the HARQ manager 1240 may transmit a first transmission of the first data packet via the first subchannel of the carrier and a second transmission of the first data packet via the second subchannel of the carrier, where the feedback message is a joint feedback message that provides feedback for the first transmission and the second transmission.

Figure 13:
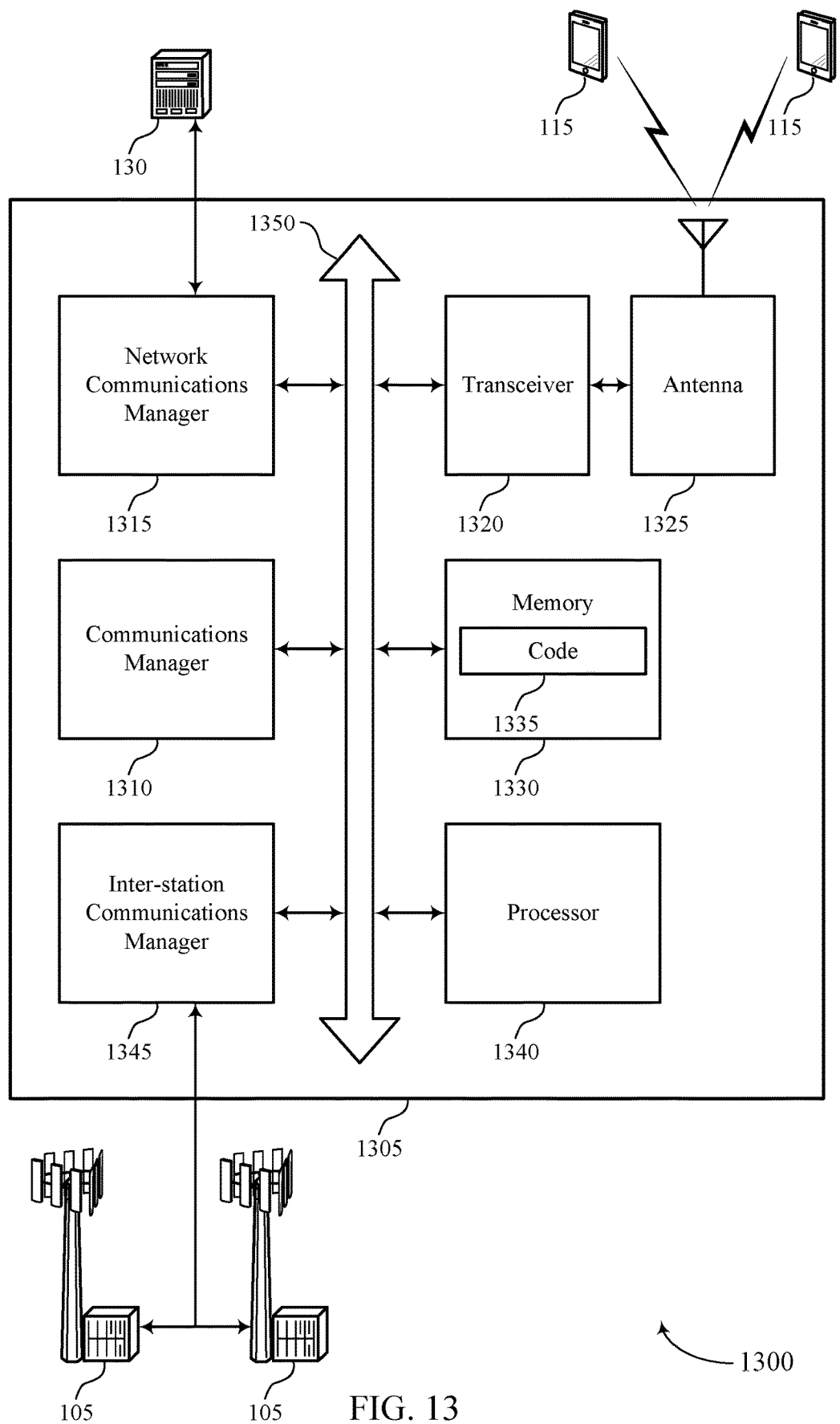
FIG. 13 shows a diagram of a system including a device in accordance with aspects of the present disclosure.

FIG. 13 shows a diagram of a system 1300 including a device 1305 in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit configuration signaling indicating a mapping of a first logical channel to a first subchannel of a carrier and a second logical channel to a second subchannel of the carrier and transmit or receiving a transmission of a first data packet via the first subchannel of the carrier and a duplicate of the transmission associated with the second logical channel via the second subchannel of the carrier based on the mapping. The communications manager 1310 may also transmit one or more grants scheduling transmission of a first data packet in a first subchannel and a second subchannel of a carrier and transmit or receiving the transmission via the first subchannel and the second subchannel of the carrier based on the one or more grants.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting packet duplication for high reliability communication).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
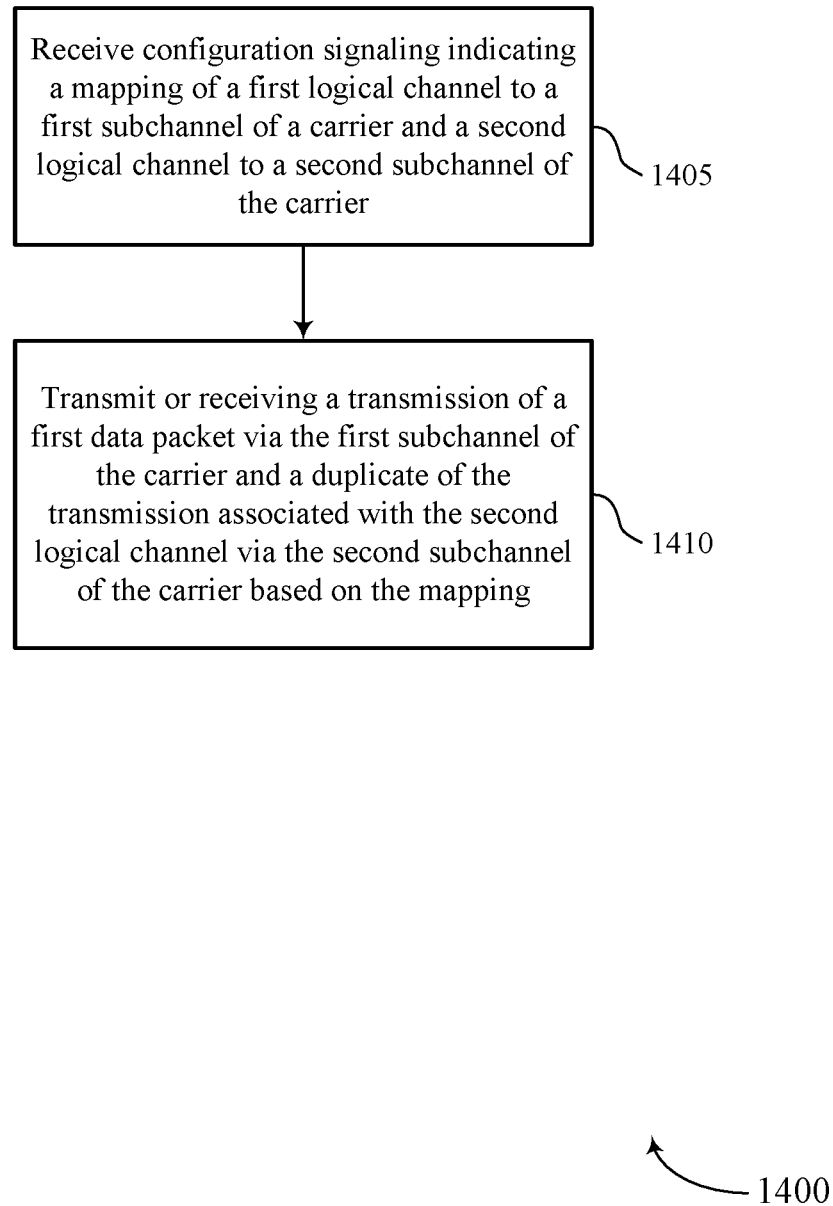
FIGS. 14-17 show flowcharts illustrating methods in accordance with aspects of the present disclosure.

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1405, the UE may receive configuration signaling indicating a mapping of a first logical channel to a first subchannel of a carrier and a second logical channel to a second subchannel of the carrier. The operations of 1405 may be performed according to the methods described herein. In some examples, aspects of the operations of 1405 may be performed by a configuration signaling manager as described with reference to FIGS. 6 through 9.

At 1410, the UE may transmit or receiving a transmission of a first data packet via the first subchannel of the carrier and a duplicate of the transmission associated with the second logical channel via the second subchannel of the carrier based on the mapping. The operations of 1410 may be performed according to the methods described herein. In some examples, aspects of the operations of 1410 may be performed by a packet manager as described with reference to FIGS. 6 through 9.

Figure 15:
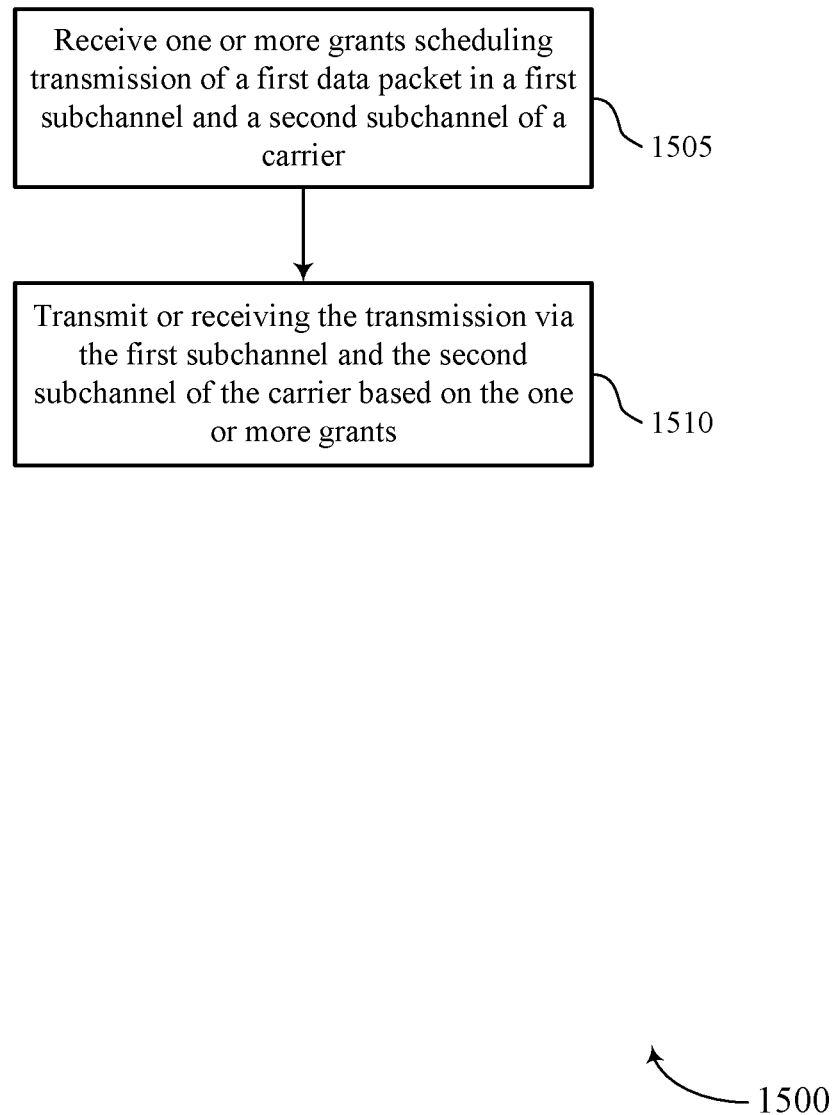

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1505, the UE may receive one or more grants scheduling transmission of a first data packet in a first subchannel and a second subchannel of a carrier. The operations of 1505 may be performed according to the methods described herein. In some examples, aspects of the operations of 1505 may be performed by a grant manager as described with reference to FIGS. 6 through 9.

At 1510, the UE may transmit or receiving the transmission via the first subchannel and the second subchannel of the carrier based on the one or more grants. The operations of 1510 may be performed according to the methods described herein. In some examples, aspects of the operations of 1510 may be performed by a packet manager as described with reference to FIGS. 6 through 9.

Figure 16:
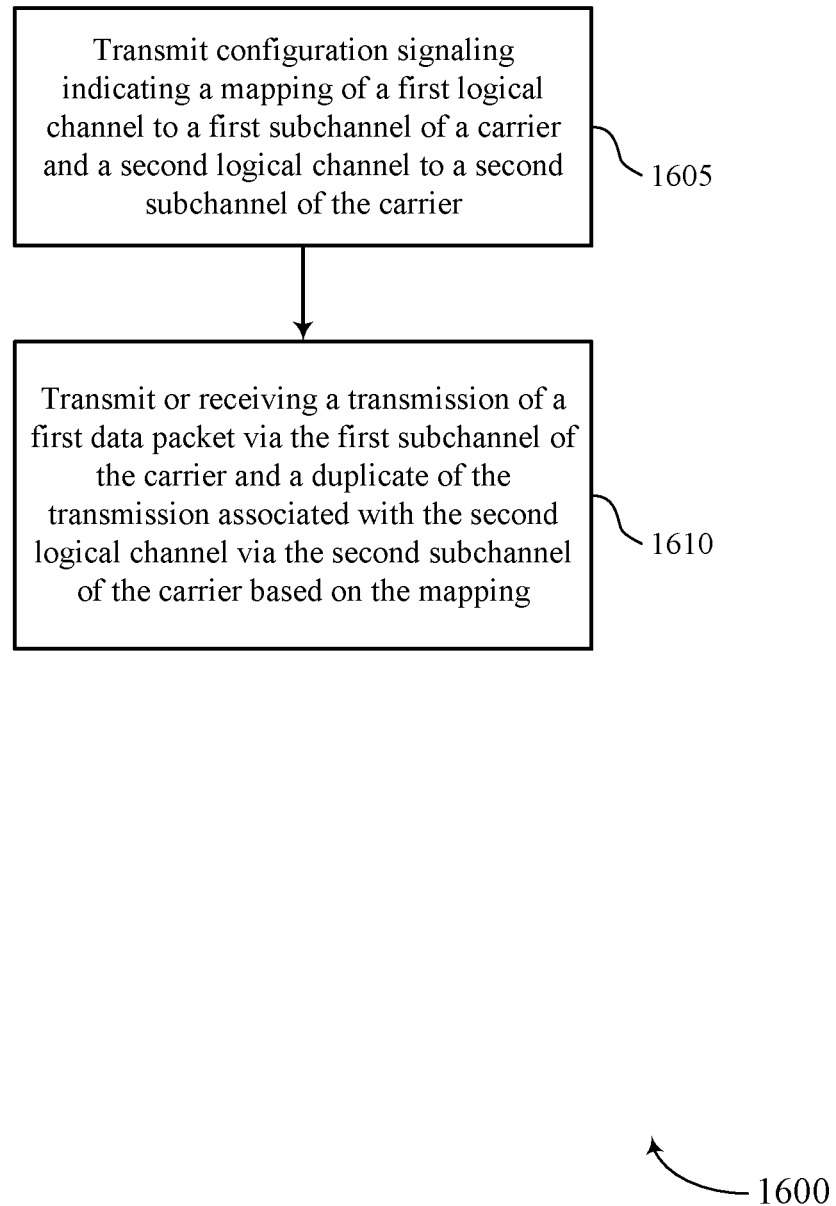

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1605, the base station may transmit configuration signaling indicating a mapping of a first logical channel to a first subchannel of a carrier and a second logical channel to a second subchannel of the carrier. The operations of 1605 may be performed according to the methods described herein. In some examples, aspects of the operations of 1605 may be performed by a configuration signaling manager as described with reference to FIGS. 10 through 13.

At 1610, the base station may transmit or receiving a transmission of a first data packet via the first subchannel of the carrier and a duplicate of the transmission associated with the second logical channel via the second subchannel of the carrier based on the mapping. The operations of 1610 may be performed according to the methods described herein. In some examples, aspects of the operations of 1610 may be performed by a packet manager as described with reference to FIGS. 10 through 13.

Figure 17:
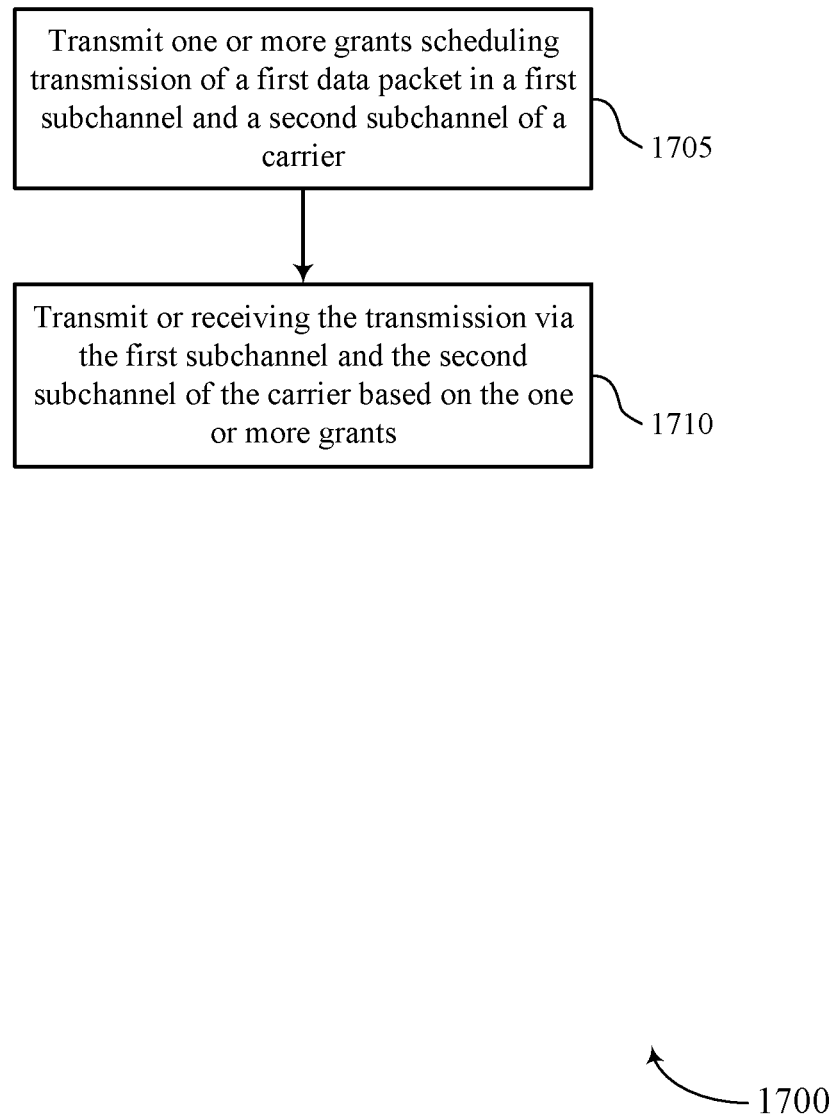

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1705, the base station may transmit one or more grants scheduling transmission of a first data packet in a first subchannel and a second subchannel of a carrier. The operations of 1705 may be performed according to the methods described herein. In some examples, aspects of the operations of 1705 may be performed by a grant manager as described with reference to FIGS. 10 through 13.

At 1710, the base station may transmit or receiving the transmission via the first subchannel and the second subchannel of the carrier based on the one or more grants. The operations of 1710 may be performed according to the methods described herein. In some examples, aspects of the operations of 1710 may be performed by a packet manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment, comprising:
receiving one or more grants that schedule downlink or uplink transmission of a first physical layer (PHY) data packet via at least one of a first listen before talk (LBT) subchannel or a second LBT subchannel of a carrier; and transmitting or receiving the first PHY data packet via the first LBT subchannel and a duplicate of the first PHY data packet via the second LBT subchannel of the carrier in accordance with the one or more grants.

2. The method of claim 1, further comprising:
receiving configuration signaling indicating a rate matching scheme.

3. The method of claim 2, wherein the transmitting or receiving further comprises:
receiving a first transmission of the first PHY data packet via the first LBT subchannel of the carrier and a second transmission of the first PHY data packet via the second LBT subchannel of the carrier;
de-rate matching the first transmission to generate a de-rate matched first transmission based at least in part on the rate matching scheme;
de-rate matching the second transmission to generate a de-rate matched second transmission based at least in part on the rate matching scheme; and
applying a decoding algorithm to the de-rate matched first transmission, the de-rate matched second transmission, or both.

4. The method of claim 3, wherein the rate matching scheme indicates that the de-rate matched first transmission includes a first redundancy version generated from the first PHY data packet and at least a portion of a second redundancy version generated from the first PHY data packet.

5. The method of claim 2, wherein the transmitting or receiving further comprises:
rate matching a first transmission of the first PHY data packet to generate a rate matched first transmission based at least in part on the rate matching scheme;
rate matching a second transmission of the first PHY data packet to generate a rate matched second transmission based at least in part on the rate matching scheme; and
transmitting the rate matched first transmission via the first LBT subchannel of the carrier and the rate matched second transmission via the second LBT subchannel of the carrier.

6. The method of claim 5, wherein the rate matching scheme indicates that the rate matched first transmission includes a first redundancy version generated from the first PHY data packet and at least a portion of a second redundancy version generated from the first PHY data packet.

7. The method of claim 1, further comprising:
receiving configuration signaling indicating a code rate; and
decoding the first PHY data packet based at least in part on the code rate.

8. The method of claim 1, wherein receiving the one or more grants further comprises:
receiving a first grant scheduling a first transmission of the first PHY data packet via the first LBT subchannel of the carrier and a second grant scheduling a second transmission of the first PHY data packet via the second LBT subchannel of the carrier.

9. The method of claim 8, further comprising:
determining an association between the first transmission and the second transmission based at least in part on the first grant and the second grant; and
soft combining the first transmission and the second transmission to decode the first PHY data packet based at least in part on the association.

10. The method of claim 9, wherein determining the association further comprises:
identifying a common feedback identifier for the first LBT subchannel of the carrier and the second LBT subchannel of the carrier within a same transmission time interval, wherein the first transmission and the second transmission each correspond to the common feedback identifier.

11. The method of claim 8, further comprising:
transmitting a joint feedback message via the first LBT subchannel, the second LBT subchannel, or both, to provide joint feedback on the first transmission and the second transmission.

12. The method of claim 8, further comprising:
transmitting a first feedback message via the first LBT subchannel of the carrier to provide feedback on the first transmission and a second feedback message via the second LBT subchannel of the carrier to provide feedback on the second transmission.

13. The method of claim 1, further comprising:
generating the duplicate of the first PHY data packet to include a duplication tag; and
generating a first transmission comprising the first PHY data packet and a second transmission comprising the duplicate of the first PHY data packet based at least in part on the duplication tag, wherein the transmitting or receiving further comprises:
transmitting the first transmission via the first LBT subchannel of the carrier and the second transmission via the second LBT subchannel of the carrier.

14. The method of claim 13, wherein the first PHY data packet is a medium access control service data unit (MAC-SDU).

15. The method of claim 1, further comprising:
receiving configuration signaling indicating at least one feedback resource for the first LBT subchannel, the second LBT subchannel, or both; and
transmitting, via the at least one feedback resource, a feedback message.

16. The method of claim 15, wherein the transmitting or receiving further comprises:
receiving a first transmission of the first PHY data packet via the first LBT subchannel of the carrier and a second transmission of the first PHY data packet via the second LBT subchannel of the carrier, wherein the feedback message is a joint feedback message that provides feedback for the first transmission and the second transmission.

17. The method of claim 1, wherein each of the first LBT subchannel and the second LBT subchannel is a different LBT subchannel of the carrier.

18. The method of claim 1, wherein each of the first LBT subchannel and the second LBT subchannel is a different bandwidth part of the carrier.

19. The method of claim 1, wherein the transmitting or receiving further comprises:
receiving a first transmission of the first PHY data packet via the first LBT subchannel of the carrier and a second transmission of the first PHY data packet via the second LBT subchannel of the carrier, wherein each of the first transmission and the second transmission is self-decodable.

20. A method for wireless communication by a network entity, comprising:
transmitting one or more grants scheduling downlink or uplink transmission of a first physical layer (PHY) data packet via at least one of a first listen before talk (LBT) subchannel or a second LBT subchannel of a carrier; and
transmitting or receiving the first PHY data packet via the first LBT subchannel and a duplicate of the first PHY data packet via the second LBT subchannel of the carrier in accordance with the one or more grants.

21. The method of claim 20, further comprising:
transmitting configuration signaling indicating a rate matching scheme.

22. The method of claim 21, wherein the transmitting or receiving further comprises:
receiving a first transmission of the first PHY data packet via the first LBT subchannel of the carrier and a second transmission of the first PHY data packet via the second LBT subchannel of the carrier;
de-rate matching the first transmission to generate a de-rate matched first transmission based at least in part on the rate matching scheme;
de-rate matching the second transmission to generate a de-rate matched second transmission based at least in part on the rate matching scheme; and
applying a decoding algorithm to the de-rate matched first transmission, the de-rate matched second transmission, or both.

23. The method of claim 22, wherein the rate matching scheme indicates that the de-rate matched first transmission includes a first redundancy version generated from the first PHY data packet and at least a portion of a second redundancy version generated from the first PHY data packet.

24. The method of claim 23, wherein the rate matching scheme indicates that the de-rate matched second transmission includes the first redundancy version of the first PHY data packet and at least a portion of a third redundancy version of the first PHY data packet, the second redundancy version differing from the third redundancy version.

25. The method of claim 21, wherein the transmitting or receiving further comprises:
rate matching a first transmission of the first PHY data packet to generate a rate matched first transmission based at least in part on the rate matching scheme;
rate matching a second transmission of the first PHY data packet to generate a rate matched second transmission based at least in part on the rate matching scheme; and
transmitting the rate matched first transmission via the first LBT subchannel of the carrier and the rate matched second transmission via the second LBT subchannel of the carrier.

26. The method of claim 20, wherein transmitting the one or more grants further comprises:
transmitting a first grant scheduling a first transmission of the first PHY data packet via the first LBT subchannel of the carrier and a second grant scheduling a second transmission of the first PHY data packet via the second LBT subchannel of the carrier.

27. The method of claim 20, further comprising:
transmitting configuration signaling indicating at least one feedback resource for the first LBT subchannel, the second LBT subchannel, or both; and
receiving, via the at least one feedback resource, a feedback message.

28. An apparatus for wireless communication by a user equipment, comprising:
a processor,
memory coupled with the processor; and
instructions stored in the memory and executable by the processor to cause the apparatus to:
receive one or more grants scheduling downlink or uplink transmission of a first physical layer (PHY) data packet via at least of a first listen before talk (LBT) subchannel or a second LBT subchannel of a carrier; and
transmit or receive the first PHY data packet via the first LBT subchannel and a duplicate of the first PHY data packet via the second LBT subchannel of the carrier in accordance with the one or more grants.

29. An apparatus for wireless communication by a network entity, comprising:
a processor,
memory coupled with the processor; and
instructions stored in the memory and executable by the processor to cause the apparatus to:
transmit one or more grants scheduling downlink or uplink transmission of a first physical layer (PHY) data packet via at least one of a first listen before talk (LBT) subchannel or a second LBT subchannel of a carrier; and
transmit or receive the first PHY data packet via the first LBT subchannel and a duplicate of the first PHY data packet via the second LBT subchannel of the carrier in accordance with the one or more grants.

* * * * *